United States Patent
Jo

(10) Patent No.: US 11,347,438 B2
(45) Date of Patent: May 31, 2022

(54) STORAGE DEVICE, HOST DEVICE CONTROLLING STORAGE DEVICE, AND OPERATION METHOD OF STORAGE DEVICE

(71) Applicant: SAMSUNG ELECTRONICS CO., LTD., Suwon-si (KR)

(72) Inventor: Myung Hyun Jo, Hwaseong-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 67 days.

(21) Appl. No.: 17/035,929

(22) Filed: Sep. 29, 2020

(65) Prior Publication Data

US 2021/0011665 A1    Jan. 14, 2021

Related U.S. Application Data

(63) Continuation of application No. 16/024,931, filed on Jul. 2, 2018, now Pat. No. 10,817,218.

(30) Foreign Application Priority Data

Nov. 24, 2017    (KR) .................. 10-2017-0158419

(51) Int. Cl.
*G06F 3/06* (2006.01)

(52) U.S. Cl.
CPC ............ *G06F 3/0659* (2013.01); *G06F 3/061* (2013.01); *G06F 3/0656* (2013.01); *G06F 3/0679* (2013.01)

(58) Field of Classification Search
CPC ...... G06F 3/0659; G06F 3/061; G06F 3/0656; G06F 3/0679; G06F 3/0655
See application file for complete search history.

(56) References Cited

U.S. PATENT DOCUMENTS

| | | | |
|---|---|---|---|
| 9,003,071 | B2 | 4/2015 | Liu |
| 9,122,515 | B2 | 9/2015 | Walker et al. |
| 9,619,251 | B2 | 4/2017 | Moen et al. |
| 2013/0138868 | A1 | 5/2013 | Seroff |
| 2014/0281040 | A1 | 9/2014 | Liu |
| 2015/0058863 | A1 | 2/2015 | Karamanolis et al. |
| 2016/0224248 | A1 | 8/2016 | Choi et al. |
| 2016/0259568 | A1 | 9/2016 | Grimsrud et al. |
| 2016/0267016 | A1 | 9/2016 | Lee et al. |
| 2016/0306549 | A1* | 10/2016 | Nadakuditi ............ G06F 3/061 |
| 2016/0378353 | A1 | 12/2016 | Schmisseur et al. |
| 2017/0083252 | A1 | 3/2017 | Singh et al. |
| 2017/0090753 | A1 | 3/2017 | Benisty et al. |
| 2017/0102873 | A1 | 4/2017 | Hanson et al. |
| 2017/0123656 | A1 | 5/2017 | Benisty et al. |

(Continued)

FOREIGN PATENT DOCUMENTS

KR    1020160123930 A    10/2016

*Primary Examiner* — Tracy A Warren

(74) *Attorney, Agent, or Firm* — Volentine, Whitt & Francos, PLLC

(57) ABSTRACT

A storage device includes a first physical space including first nonvolatile memory devices, a second physical space including second nonvolatile memory devices physically isolated from the first nonvolatile memory devices, and a storage controller that fetches a command from an external device and performs an operation corresponding to the command in any one of the first and second physical spaces, based on information included in the fetched command.

20 Claims, 18 Drawing Sheets

(56) References Cited

U.S. PATENT DOCUMENTS

| | | |
|---|---|---|
| 2017/0123707 A1 | 5/2017 | Carey |
| 2017/0177222 A1 | 6/2017 | Singh et al. |
| 2017/0199765 A1 | 7/2017 | Ahn et al. |
| 2017/0206104 A1 | 7/2017 | Sliwa et al. |
| 2018/0225151 A1 | 8/2018 | Park |
| 2019/0034306 A1 | 1/2019 | Wysocki et al. |
| 2019/0042150 A1 | 2/2019 | Wells et al. |

* cited by examiner

STORAGE DEVICE, HOST DEVICE CONTROLLING STORAGE DEVICE, AND OPERATION METHOD OF STORAGE DEVICE

CROSS-REFERENCE TO RELATED APPLICATIONS

This is a Continuation of U.S. application Ser. No. 16/024,931, filed Jul. 2, 2018, and a claim of priority under 35 U.S.C. § 119 is made to Korean Patent Application No. 10-2017-0158419 filed Nov. 24, 2017, in the Korean Intellectual Property Office, the entire contents of both application being incorporated herein by reference.

BACKGROUND

The present inventive concepts herein relate to a semiconductor memory, and more particularly to a storage device, a host device controlling the storage device, and an operation method of the storage device.

Semiconductor memory devices may be classified into volatile memory devices and nonvolatile memory devices. Volatile memory devices such as for example static random access memory (SRAM), dynamic RAM (DRAM), synchronous DRAM (SDRAM), and the like, lose data stored therein when powered-off. Nonvolatile memory devices such as for example read only memory (ROM), programmable ROM (PROM), electrically programmable ROM (EPROM), electrically erasable and programmable ROM (EEPROM), flash memory devices, phase-change RAM (PRAM), magnetic RAM (MRAM), resistive RAM (RRAM), ferroelectric RAM (FRAM), and the like, retain data stored therein when powered-off.

Flash memory based mass storage media communicate with an external device using a high-speed interface. In general, the external device manages a storage area of a storage medium as a logical area. In this case, a physical area where an input/output is actually performed is managed within the storage medium. That is, since a logical area managed in the external device and a physical area managed within the storage medium are different from each other, various methods for mapping the logical area and the physical area may be required. Also, the difference may cause reduction in performance.

SUMMARY

Embodiments of the inventive concepts provide a storage device providing stable performance or improved performance, a host device controlling the storage device, and an operation method of the storage device.

Embodiments of the inventive concepts provide a storage device including a first physical space including first nonvolatile memory devices; a second physical space including second nonvolatile memory devices physically isolated from the first nonvolatile memory devices; and a storage controller that fetches a command from an external device and performs an operation corresponding to the fetched command in one of the first and second physical spaces, based on information included in the fetched command.

Embodiments of the inventive concepts further provide an operation method of a storage device including fetching by the storage device a command from an external device; selecting by the storage device a physical space from among a plurality of physical spaces of the storage device based on information in the command, the plurality of physical spaces being physically isolated from each other and recognized by the external device; performing by the storage device an operation corresponding to the command in the selected physical space; and transmitting by the storage device completion information of the operation corresponding to the command to the external device.

Embodiments of the inventive concepts still further provide a host device including a first core that drives a first process; a second core that drives a second process; a host buffer memory that includes a first submission queue and a second submission queue, the first submission queue being mapped onto a first physical space of an external storage device and queuing a first command generated by the first core, and the second submission queue being mapped onto a second physical space of the external storage device physically isolated from the first physical space and queuing a second command generated by the second core; and a host driver that provides the first and second commands to the external storage device.

Embodiments of the inventive concepts still further provide a storage device including a first physical space including first nonvolatile memory devices; a second physical space including second volatile memory devices physically isolated from the first nonvolatile memory devices; and a storage controller configured to perform in the first physical space operations corresponding to a first process executed by an external device, in response to first commands received from the external device and that correspond to the first process, and to perform in the second physical space operations corresponding to a second process executed by the external device, in response to second commands received from the external device and that correspond to the second process.

BRIEF DESCRIPTION OF THE FIGURES

The above and other objects and features of the inventive concepts will become apparent in view of the following description of exemplary embodiments made with reference to the accompanying drawings.

DETAILED DESCRIPTION

Below, embodiments of the inventive concepts are described in detail and clearly to such an extent that one of ordinary skill in the art may easily implement the inventive concepts.

As is traditional in the field of the inventive concepts, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the inventive concepts. Likewise, the blocks of the embodiments may be physically combined into more complex blocks without departing from the scope of the inventive concepts.

Figure 1:
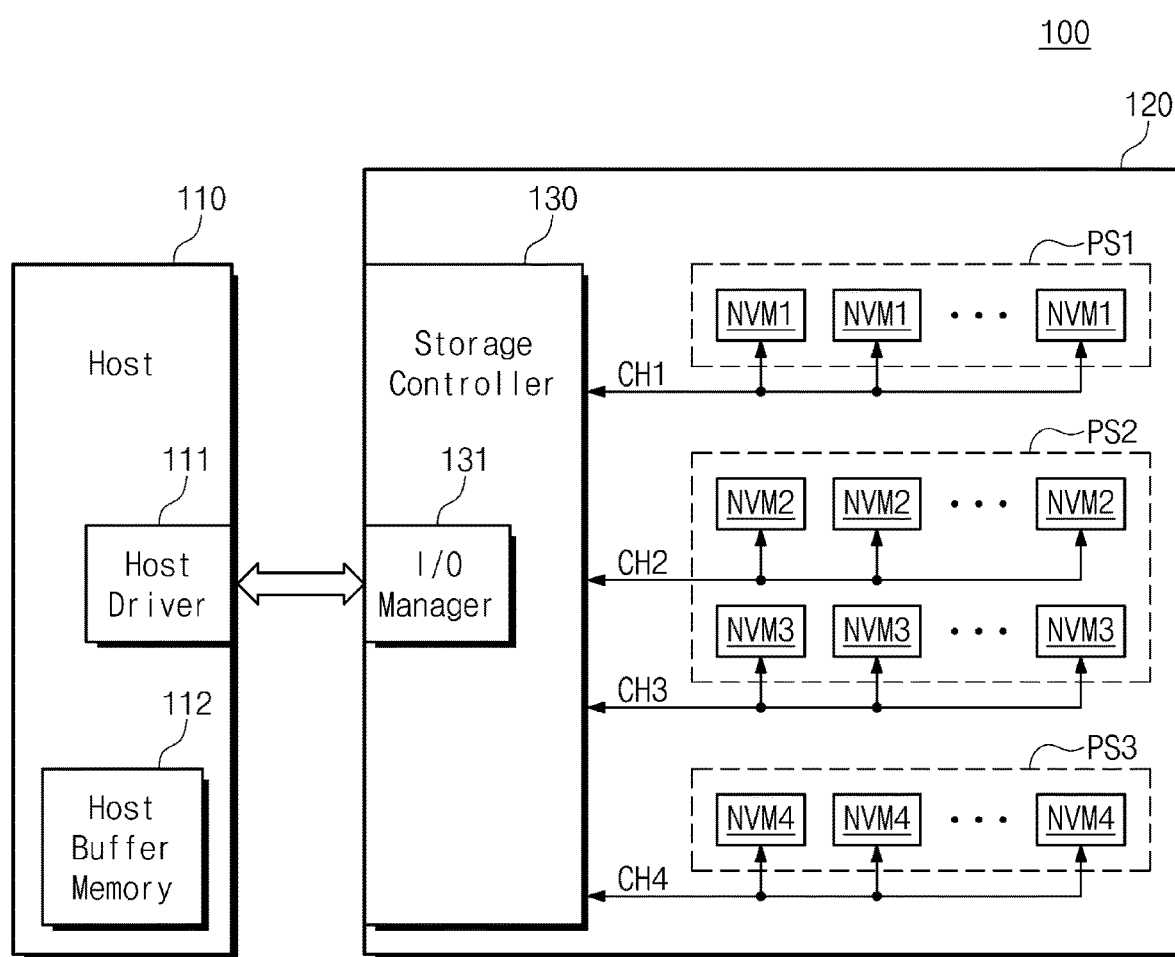
FIG. 1 illustrates a block diagram of a storage system according to an embodiment of the inventive concepts.

FIG. 1 illustrates a block diagram of a storage system according to an embodiment of the inventive concepts. Referring to FIG. 1, a storage system 100 includes a host 110 and a storage device 120.

The host 110 may communicate with the storage device 120 over an interface that is determined in advance. Through the interface the host 110 may for example store data in the storage device 120 or may read data stored in the storage device 120. In embodiments of the inventive concepts the interface may be a peripheral component interconnect express (PCI-express) interface. However, in other embodiments other interfaces may be used.

The host 110 includes a host driver 111 and a host buffer memory 112. The host driver 111 may manage commands or instructions from various applications that are driven on the host 110.

The host buffer memory 112 may be configured to store information needed for the host 110 to operate. In an example embodiment, the host buffer memory 112 may include an administration queue, a submission queue, and a completion queue. The administration queue may be a queue for managing information or an instruction needed for the host driver 111 to control the storage device 120. The submission queue may be a queue for managing a command or an input/output (I/O) to be provided to the storage device 120. The completion queue may be a queue for managing information about an operation completed in the storage device 120. In an example embodiment, the administration queue, the submission queue, and the completion queue may be managed by the host driver 111 or a storage controller (such as storage controller 130 for example).

The storage device 120 includes the storage controller 130 and a plurality of nonvolatile memory devices NVM1, NVM2, NVM3 and NVM4. The storage controller 130 may be configured to process various requests from the host 110. For example, the storage controller 130 may store data in, or read data from, at least one of the plurality of nonvolatile memory devices NVM1 to NVM4 depending on a request of the host 110. In an example embodiment, the storage controller 130 may be an NVMe controller that is based on a nonvolatile memory express (NVMe) interface.

The storage controller 130 may communicate with the nonvolatile memory devices NVM1 to NVM4 through a plurality of channels CH1 to CH4. In an example embodiment, four channels CH1 to CH4 are illustrated in FIG. 1. However, in other embodiments the number of channels may increase or decrease depending on a particular application.

Under control of the storage controller 130, each of the plurality of nonvolatile memory devices NVM1 to NVM4 may store data or may output data stored therein. In an example embodiment, each of the plurality of nonvolatile memory devices NVM1 to NVM4 may include NAND flash memory. However, in other embodiments each of the plurality of nonvolatile memory devices NVM1 to NVM4 may include for example at least one of various memory devices such as static random access memory (SRAM), dynamic RAM (DRAM), synchronous DRAM (SDRAM), read only memory (ROM), programmable ROM (PROM), electrically programmable ROM (EPROM), electrically erasable and programmable ROM (EEPROM), flash memory device(s), phase-change RAM (PRAM), magnetic RAM (MRAM), resistive RAM (RRAM), ferroelectric RAM (FRAM), and the like.

In an example embodiment, the storage controller 130 includes an input/output (I/O) manager 131. The input/output manager 131 may be configured to manage a command or an I/O provided or fetched from the host 110. In other embodiments, the command or I/O may be fetched from an external device.

For example, the host 110 may recognize a storage space of the storage device 120 as nonvolatile memory sets (NVM sets) that are physically distinguished from each other. Each of the nonvolatile memory sets may include different nonvolatile memory devices. Below, for convenience of description, a nonvolatile memory set is referred to as a "physical space (PS)".

That is, the host 110 may recognize a storage space of the storage device 120 as or including first to third physical spaces PS1 to PS3. In other words, the host 110 may recognize a storage space of the storage device 120 as areas that are physically distinguished from each other. This may mean that the host 110 can individually or independently control each of the first to third physical spaces PS1 to PS3. The input/output manager 131 may manage a command or an I/O from the host 110 such that the command or I/O from the host 110 are performed in a corresponding physical space of the first to third physical spaces PS1 to PS3.

That is, the first physical space PS1 may include a plurality of nonvolatile memory devices NVM1 (i.e., first nonvolatile memory devices) connected with the first channel CH1, and the second physical space PS2 may include a plurality of nonvolatile memory devices NVM2 (i.e., second nonvolatile memory devices) and NMV3 (i.e., third nonvolatile memory devices) connected with the second and third channels CH2 and CH3, respectively. The third physical space PS3 may include a plurality of nonvolatile memory devices NVM4 (i.e., fourth nonvolatile memory devices) connected with the fourth channel CH4. The input/output manager 131 may allow a command or I/O corresponding to the first physical space PS1 to be performed in the plurality of nonvolatile memory devices NVM1 connected with the first channel CH1, and a command or I/O corresponding to the second physical space PS2 to be performed in the plurality of nonvolatile memory devices NVM2 and NMV3 connected with the second and third channels CH2 and CH3.

Below, for convenience of description, it is assumed that the first to third physical spaces PS1 to PS3 are distinguished in units of channels. However, in other embodiments the first to third physical spaces PS1 to PS3 may be distinguished differently. For example, physical spaces that are recognized by the host 110 may be distinguished in units of memory blocks, sub blocks, planes, semiconductor chips, or packages of nonvolatile memory devices, or may be distinguished in units of channels or ways of the storage device 120. For example, physical spaces PS1 to PS3 may be physically isolated from each other for example by way of being connected to different channels, or by being different memory blocks, sub blocks, planes, semiconductor chips, or packages of nonvolatile memory devices, or the like.

In an example embodiment, the first to third physical spaces PS1 to PS3 illustrated in FIG. 1 are exemplary. However, in other embodiments the number of physical spaces that are recognized by the host 110 may for example increase or decrease under control of the host 110 or depending on implementation of the storage device 120.

Conventional storage systems recognize and manage a storage area of a storage device as logically divided areas (e.g., a namespace). In this case, even though an I/O is associated with the same logical area, a storage controller may perform the I/O on different physical areas in compliance with a predefined I/O distribution rule. Since the I/O is distributed into different physical areas, a specific level of performance cannot be secured due to various factors (e.g., a delay of a previous operation in a specific physical area or the like).

In contrast, the host 110 according to an example embodiment of the inventive concepts may recognize a storage area of the storage device 120 as physically divided areas (i.e., the physical spaces PS), and may manage a command or I/O with respect to each of the physical spaces PS1 to PS3. That is, since each of the physically divided physical spaces PS1 to PS3 are individually managed by the host 110, a specific level of performance may be secured with regard to an I/O or I/O groups. A configuration and an effect according to example embodiments of the inventive concepts will be more fully described as follows with reference to the accompanying drawings.

Figure 2:
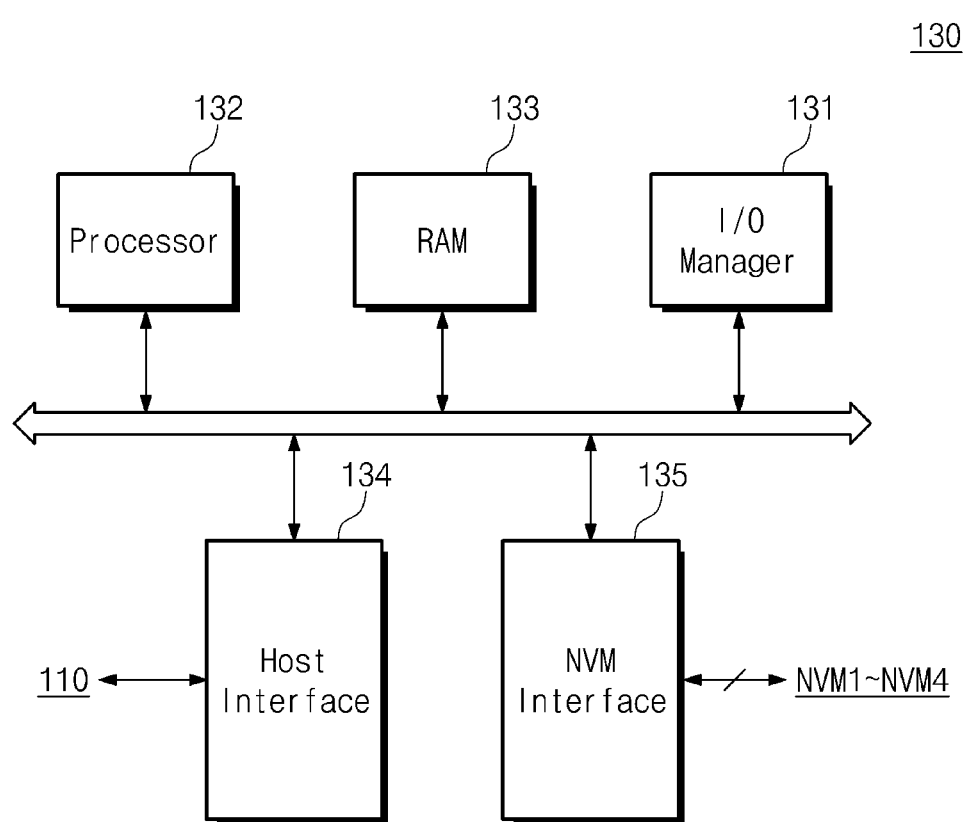
FIG. 2 illustrates a block diagram of a storage controller of FIG. 1.

FIG. 2 illustrates a block diagram of the storage controller 130 of FIG. 1. Referring to FIGS. 1 and 2, the storage controller 130 includes the input/output manager 131, a processor 132, a random access memory (RAM) 133, a host interface 134, and a flash interface 135.

The input/output manager 131 may be configured to manage a command or an I/O from the host 110, as described above. In an example embodiment, the input/output manager 131 may be implemented in the form of software, hardware, or a combination thereof. The input/output manager 131 may be included in the host interface 134 and may perform the above-described management operation. Alternatively, the input/output manager 131 may perform the above-described management operation under control of the processor 132 or may be driven by the processor 132.

The processor 132 may control overall operations of the storage controller 130. The RAM 133 may store various information needed for the storage controller 130 to operate. The RAM 133 may be a buffer memory, a cache memory, or a working memory of the storage controller 130.

The storage controller 130 may communicate with the host 110 through the host interface 134. As described above, the host interface 134 may be a PCIe interface. However, in other embodiments the host interface 134 may for example include at least one of various communication interfaces such as a universal serial bus (USB) interface, a Multi-Media Card™ (MMC) interface, an embedded MMC (eMMC) interface, an advanced technology attachment (ATA) interface, a serial-ATA interface, a parallel-ATA interface, a small computer small interface (SCSI), an enhanced small disk interface (ESDI), an integrated drive electronics (IDE) interface, a Firewire interface, a universal flash storage (UFS) interface, and the like. The storage controller 130 may communicate with the plurality of nonvolatile memory devices NVM1 to NVM4 through the flash interface 135. In an example embodiment, the flash interface 135 may provide the plurality of channels CH1 to CH4 that are physically distinguished from each other.

Figure 3:
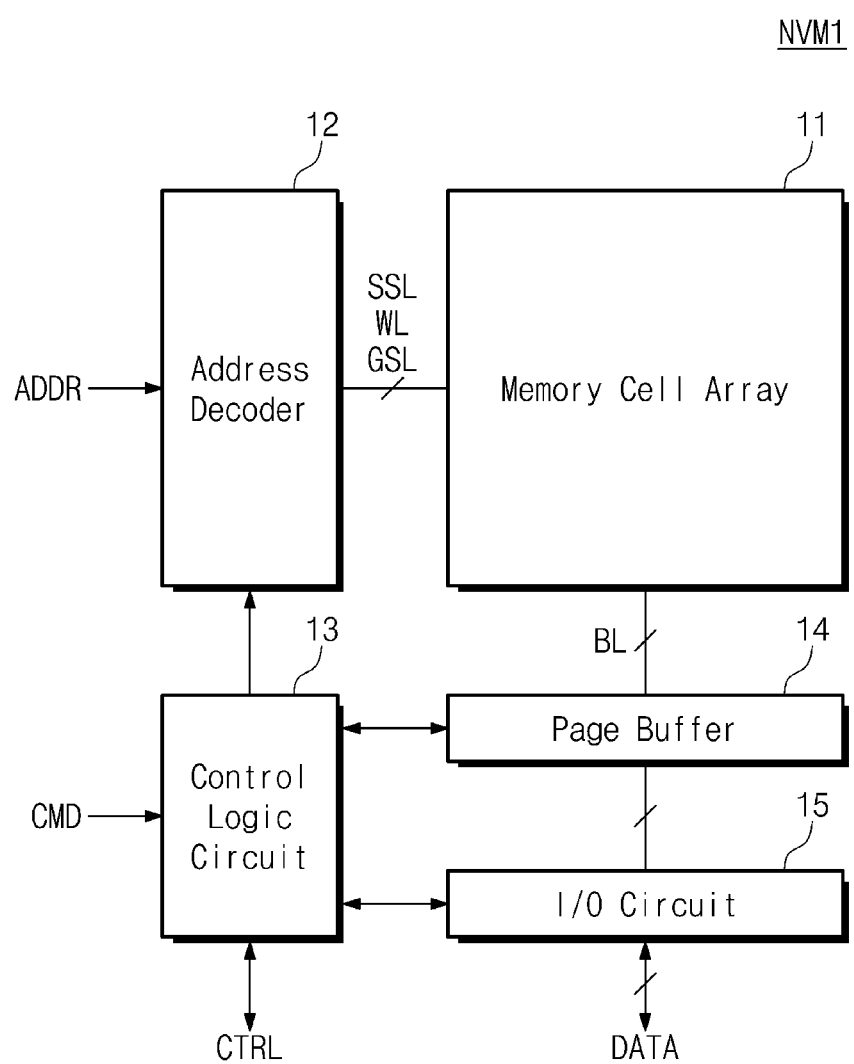
FIG. 3 illustrates a block diagram of one of a plurality of nonvolatile memory devices of FIG. 1.

FIG. 3 illustrates a block diagram of one of the plurality of nonvolatile memory devices NVM1 to NVM4 of FIG. 1. Referring to FIGS. 1 and 3, the nonvolatile memory device NVM1 includes a memory cell array 11, an address decoder 12, a control logic circuit 13, a page buffer circuit 14, and an input/output circuit 15.

The memory cell array 11 may include a plurality of memory blocks. Each of the memory blocks may include a plurality of cell strings connected with bit lines BL, and each of the plurality of cell strings may include a plurality of memory cells connected with word lines WL.

The address decoder 12 may be connected with the memory cell array 11 through string selection lines SSL, the word lines WL, and ground selection lines GSL. The address decoder 12 may decode an address ADDR received from the storage controller 130 and may control voltages of the word lines WL, based on the decoded address.

The control logic circuit 13 may receive a command CMD and a control signal CTRL from the storage controller 130 and may control the address decoder 12, the page buffer circuit 14, and the input/output circuit 15 based on the received signals.

The page buffer circuit 14 is connected with the memory cell array 11 through the bit lines BL. The page buffer circuit 14 may temporarily store data to be stored in the memory cell array 11 or data read from the memory cell array 11.

The input/output circuit 15 may transmit data "DATA" received from the storage controller 130 to the page buffer circuit 14 or may transmit the data "DATA" received from the page buffer circuit 14 to the storage controller 130.

In an example embodiment, one nonvolatile memory device NVM1 is described with reference to FIG. 3. However, the remaining nonvolatile memory devices NVM2 to NVM4 may also have similar structure such as described with respect to FIG. 3. In an example embodiment, various signals (e.g., the address ADDR, the command CMD, the control signal CTRL, and the data "DATA") provided between the storage controller 130 and the plurality of nonvolatile memory devices NVM1 to NVM4 may be transmitted and received through a corresponding channel of the plurality of channels CH1 to CH4.

Figure 4:
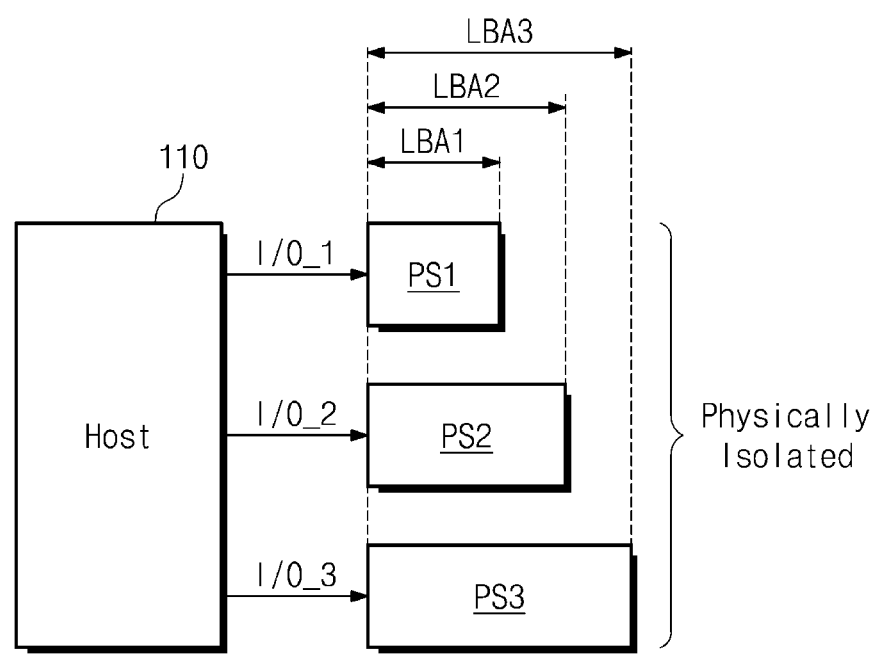
FIG. 4 illustrates a view for describing a physical space that is recognized by a host of FIG. 1.
Figure 5A:
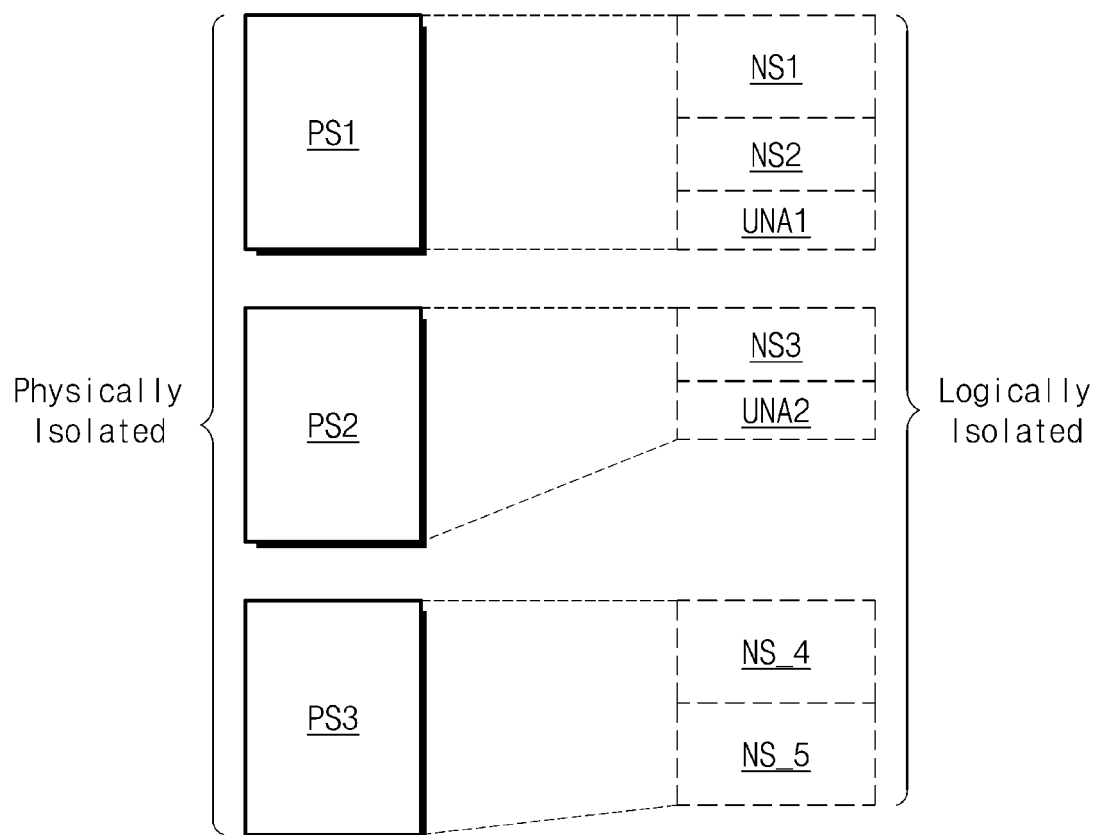
FIG. 5A illustrates another view for describing a physical space that is recognized by a host of FIG. 1.
Figure 5B:
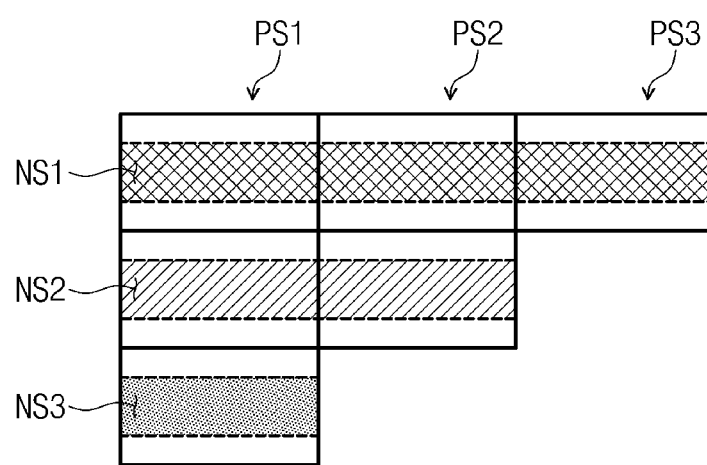
FIG. 5B illustrates another view for describing a physical space that is recognized by a host of FIG. 1.

FIGS. 4, 5A and 5B respectively illustrate views for describing a physical space PS that is recognized by the host 110 of FIG. 1. It should be understood that so as to describe the inventive concepts clearly, description or mention of components that are unnecessary to provide understanding of the physical space PS may be omitted from the following.

Referring to FIGS. 1 and 4, the host 110 may recognize a storage space of the storage device 120 as (or including) the first to third physical spaces PS1 to PS3. As described above, the first to third physical spaces PS1 to PS3 indicate storage spaces that are physically isolated from each other.

The first to third physical spaces PS1 to PS3 may for example be managed by first to third logical block addresses LBA1 to LBA3, respectively. That is, the host 110 may use the first logical block address LBA1 to manage a storage area of the first physical space PS1, use the second logical block address LBA2 to manage a storage area of the second physical space PS2, and use the third logical block address LBA3 to manage a storage area of the third physical space PS3.

In an example embodiment, the first to third logical block addresses LBA1 to LBA3 may have the same value or the same start value. However, since the first to third logical block addresses LBA1 to LBA3 respectively correspond to the different physical spaces PS1 to PS3, even though the first to third logical block addresses LBA1 to LBA3 have the same value or the same start value, physical areas respectively corresponding to the first to third logical block addresses LBA1 to LBA3 may be different from each other.

The host 110 may individually or independently control the first to third physical spaces PS1 to PS3 physically isolated through different input/outputs I/O_1 to I/O_3. In an example embodiment, the different input/outputs I/O_1 to I/O_3 may be implemented through different physical ports or input/output virtualization.

In an example embodiment, a PCIe interface or an NVMe interface may support single root-input/output virtualization (SR-IOV). That is, the host 110 may manage or control the first to third physical spaces PS1 to PS3 as the different input/outputs I/O_1 to I/O_3 through the SR-IOV function.

Referring to FIGS. 1, 5A, and 5B, the first to third physical spaces PS1 to PS3 may include a plurality of namespaces NS. For example, the NVMe interface may support a namespace that is recognized by a host. The namespace NS indicates a storage space of a nonvolatile memory formalized to logical blocks. That is, the namespace NS may indicate a logically isolated storage area that is recognized by the host 110. In contrast, the physical space PS according to the inventive concepts indicates a physically isolated storage area.

As illustrated in FIG. 5A, the first to third physical spaces PS1 to PS3 may include different namespaces NS1 to NS5 and different unallocated spaces UNA1 and UNA2, respectively. For example, the first physical space PS1 may include first and second namespaces NS1 and NS2 and the first unallocated space UNA1. As described above, each of the first and second namespaces NS1 and NS2 indicates a logically isolated area. The unallocated space UNA1 may indicate a logical storage area that is not allocated to the namespace NS. That is, since the first physical space PS1 is a physically isolated storage area, the first and second namespaces NS1 and NS2 and the first unallocated space UNA1 may be logically isolated in a storage area of the first physical space PS1.

Likewise, the second physical space PS2 may include a third namespace NS3 and a second unallocated space UNA2, and the third physical space PS3 may include fourth and fifth namespaces NS4 and NS5. Each of the third to fifth namespaces NS3 to NS5 and the second unallocated space UNA2 may be logically isolated respectively in the second and third physical spaces PS2 and PS3, respectively.

As illustrated in FIG. 5B, each of the first to third physical spaces PS1 to PS3 may include the first, second, or third namespaces NS1 to NS3. For example, the first physical space PS1 may include a part of the first namespace NS1, a part of the second namespace NS2, and the third namespace NS3. The second physical space PS2 may include another part of the first namespace NS1 and another part of the second namespace NS2. The third physical space PS3 may include another part of the first namespace NS1.

In other words, the first namespace NS1 may indicate a storage area logically isolated in the first to third physical spaces PS1 to PS3, the second namespace NS2 may indicate a storage area logically isolated in the first and second physical spaces PS1 and PS2, and the third namespace NS3 may indicate a storage area logically isolated in the third physical space PS3.

The physical spaces PS and the namespaces NS described with reference to FIGS. 4 to 5B are exemplary, and embodiments of the inventive concepts are not limited as described with respect to FIGS. 4 to 5B. For example, in other embodiments the sizes and numbers of physical spaces PS and namespaces NS may be variously set according to any manner which may be implemented by the host 110 or the storage device 120. Also, a relationship between the physical spaces PS and the namespaces NS may be set in manners other than the relationship described with reference to FIGS. 4 to 5B. In other words, embodiments of the inventive concepts should not be limited to the physical spaces PS and the namespaces NS illustrated in FIGS. 4 to 5B.

FIGS. 6A to 6D illustrate block diagrams of various topologies of a storage system according to embodiments of the inventive concepts. In an example embodiment, various topologies that are used for the host 110 to recognize a plurality of physical spaces PS will be described with reference to FIGS. 6A to 6D. For ease of illustration and for convenience of description, similar components are indicated with similar reference numerals in FIGS. 6A to 6D. Also, so as to describe the inventive concepts clearly, it should be assumed that the host 110 and the storage controller 130 are connected through a PCIe port and communicate with each other, based on an NVMe interface. However, the embodiments of the inventive concepts should not be limited as described with respect to FIGS. 6A to 6D.

Figure 6A:
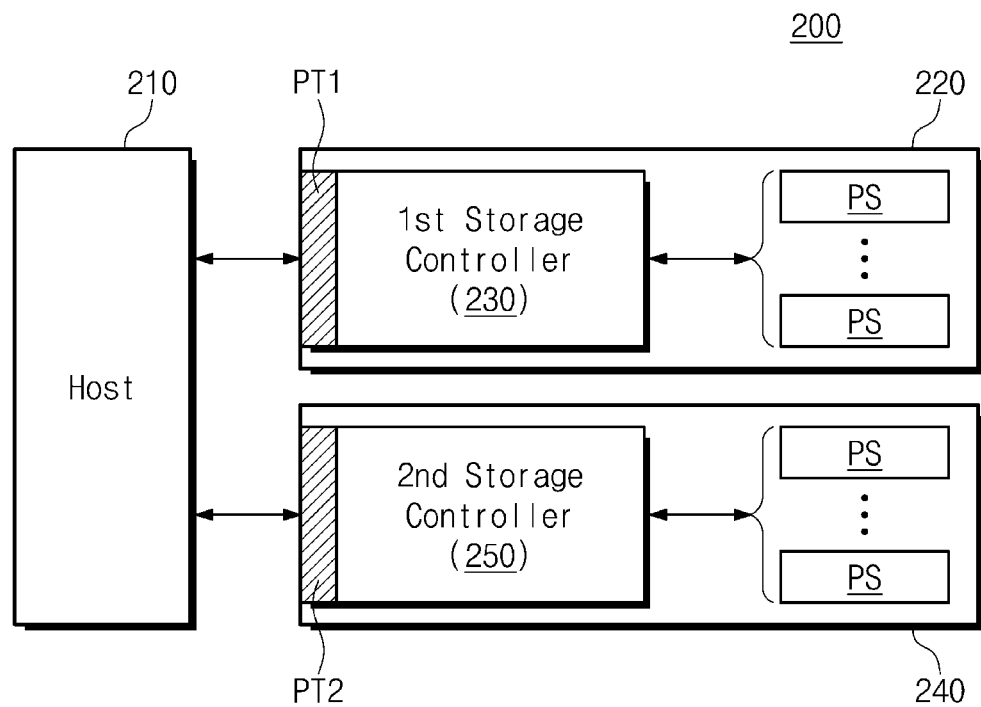
FIG. 6A illustrates a block diagram of a topology of a storage system according to an embodiment of the inventive concepts.

Referring to FIG. 6A, a storage system 200 includes a host 210 and first and second storage devices 220 and 240. The host 210 may communicate with a first storage controller 230 of the first storage device 220 through a first port PT1 and with a second storage controller 250 of the second storage device 240 through a second port PT2. In this case, the first and second storage devices 220 and 240 may be implemented with different storage devices.

As described above, the host 210 may physically isolate and recognize a storage area of each of the first and second storage devices 220 and 240 into and as a plurality of physical spaces PS. The host 210 may independently control each of the physically isolated physical spaces PS.

Figure 6B:
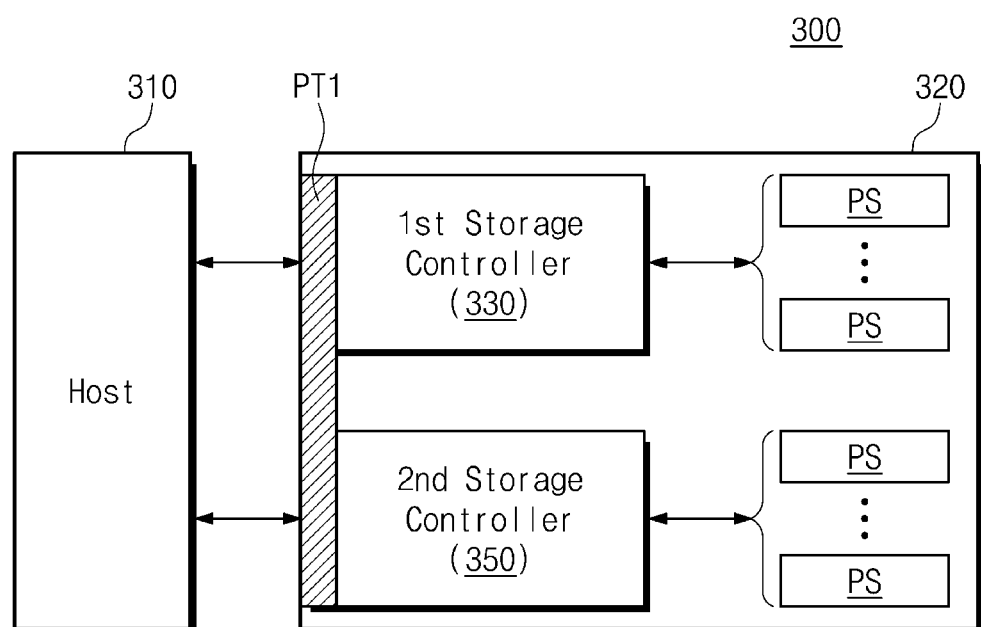
FIG. 6B illustrates a block diagram of another topology of a storage system according to an embodiment of the inventive concepts.

Referring to FIG. 6B, a storage system 300 includes a host 310 and a storage device 320. The host 310 may communicate with the storage device 320 through a first port PT1. In this case, the storage device 320 may include first and second storage controllers 330 and 350 that are physically isolated. Each of the first and second storage controllers 330 and 350 may be a physically isolated controller included in the storage device 320 and may communicate with the host 310 through the first port PT1. In an example embodiment, each of the first and second storage controllers 330 and 350 may be an NVMe controller.

As described above, the host 310 may physically isolate and recognize a storage area of the storage device 320 into and as a plurality of physical spaces PS. The host 310 may control the physically isolated physical spaces PS independently of each other.

Figure 6C:
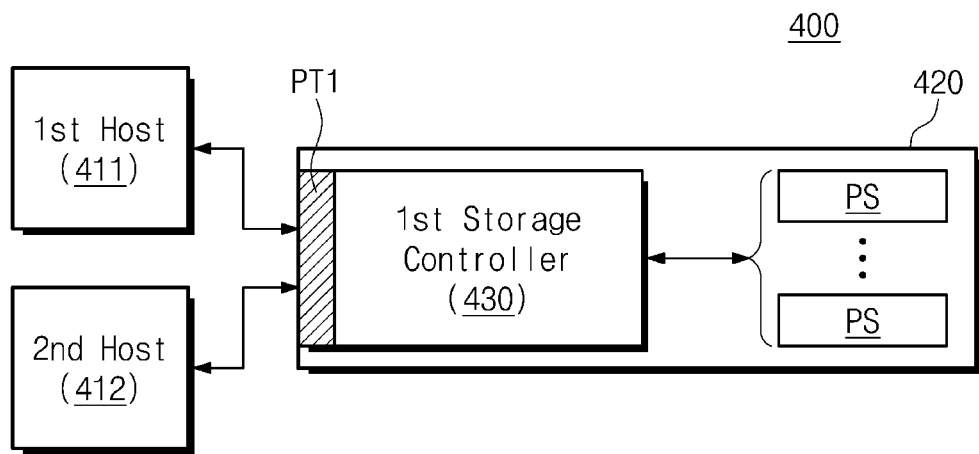
FIG. 6C illustrates a block diagram of another topology of a storage system according to an embodiment of the inventive concepts.

Referring to FIG. 6C, a storage system 400 includes first and second hosts 411 and 412 and a storage device 420. The first and second hosts 411 and 412 may communicate with a storage controller 430 of the storage device 420 through a first port PT1.

The first and second hosts 411 and 412 may recognize a storage space of the storage device 420 as a plurality of physical spaces PS. In this case, physical spaces that are recognized by the first host 411 may be different from physical spaces that are recognized by the second host 412. In an example embodiment, the first and second hosts 411 and 412 may be different cores or different processors.

Figure 6D:
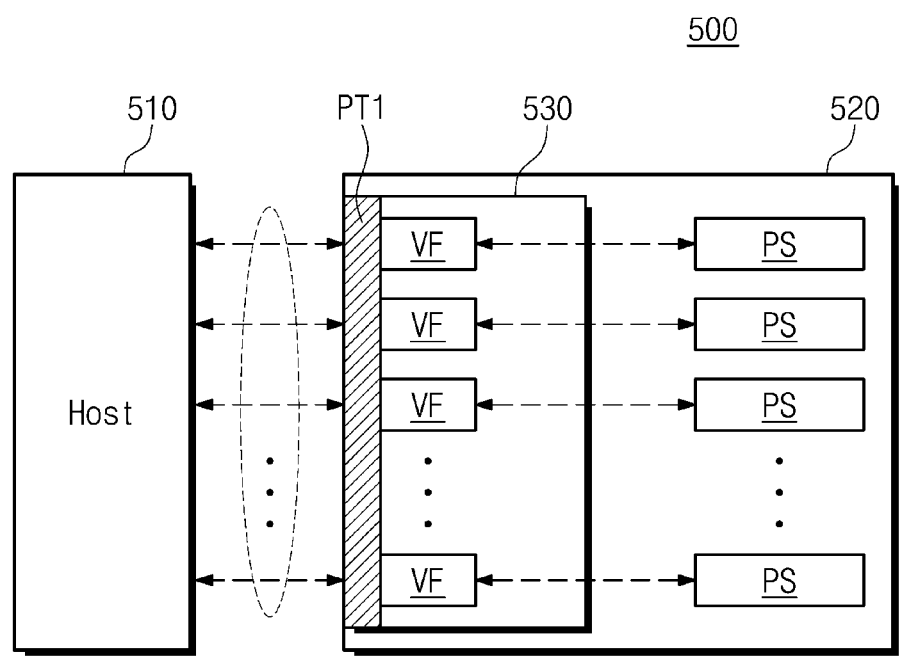
FIG. 6D illustrates a block diagram of another topology of a storage system according to an embodiment of the inventive concepts.

Referring to FIG. 6D, a storage system 500 includes a host 510 and a storage device 520. The host 510 may communicate with a storage controller 530 of the storage device 520 through a first port PT1. The storage controller 530 of the storage device 520 includes a plurality of virtual functions VF. Each of the plurality of virtual functions VF may provide a function of independently processing a command or I/O from the host 510. The host 510 may recognize a plurality of physical spaces PS through the plurality of virtual functions VF. In an example embodiment, the plurality of virtual functions VF may be implemented through the SR-IOV of the NVMe interface.

As described above, at least one host may be configured to recognize a storage area of at least one storage device as a plurality of physical spaces PS and to independently control the plurality of physical spaces PS. In an example embodiment, various topologies of a storage system capable of identifying a physical space are described with reference to FIGS. 6A to 6D. However, the embodiments of FIGS. 6A to 6D may be variously combined. A storage system that is not illustrated in the embodiments of FIGS. 6A to 6D but is capable of identifying a physical space may be variously implemented without departing from the inventive concepts.

Hereinafter, for convenience of description, embodiments of the inventive concepts will be described with reference to the storage system 100 illustrated in FIG. 1. However, the embodiments of the inventive concepts may for example be implemented through the storage systems 200 to 500 described with reference to FIGS. 6A to 6D or through a storage system similar thereto.

Figure 7:
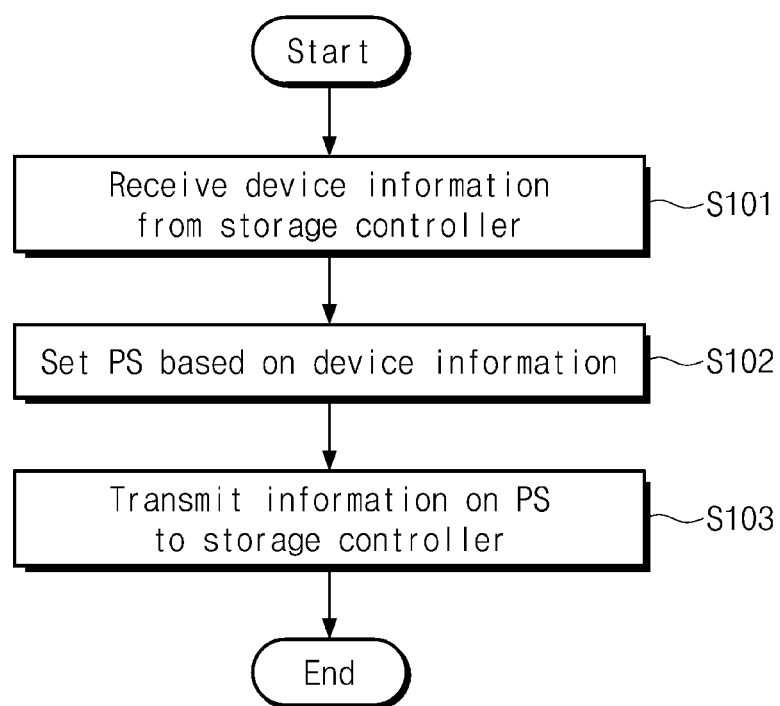
FIG. 7 illustrates a flowchart of an operation method of the host of FIG. 1.

FIG. 7 illustrates a flowchart of an operation method of the host 110 of FIG. 1. A method in which the host 110 recognizes or sets physical spaces PS will be described with reference to FIG. 7.

Referring to FIGS. 1 and 7, in operation S101, the host 110 receives device information from the storage controller 130. For example, in an initialization operation of the storage system 100, the storage controller 130 may provide the device information to the host 110. Alternatively, the host 110 may receive the device information from the storage controller 130 through a separate setting operation.

In an example embodiment, the device information may for example include the number or capacity of nonvolatile memory devices NVM included in the storage device 120, the number of channels, the number of ways, the number of maximally configurable physical spaces PS, and the like.

In operation S102, the host 110 sets physical spaces PS, based on the device information. For example, as illustrated in FIG. 1, the host 110 may set the first to third physical spaces PS1 to PS3, based on the device information. That is, the host 110 may set the plurality of nonvolatile memory devices NVM1 connected with the first channel CH1 to the first physical space PS1, may set the plurality of nonvolatile memory devices NVM2 and NVM3 connected with the second and third channels CH2 and CH3 to the second physical space PS2, and may set the plurality of nonvolatile memory devices NVM4 connected with the fourth channel CH4 to the third physical space PS3. However, in other embodiments the host 110 may set the number of physical spaces PS or the sizes of physical spaces PS in various units or various manners.

In operation S103, the host 110 transmits information about the set physical spaces PS to the storage controller 130. For example, the host 110 may provide the storage controller 130 with the number of set physical spaces, the sizes of the set physical spaces, and information of nonvolatile memory devices corresponding to the set physical spaces as information about a physical space.

In an example embodiment, the storage controller 130 may allow subsequent commands to be processed in corresponding physical spaces, based on the received information about the physical space PS.

In an example embodiment, in the case where the physical spaces PS are set in the storage device 120, the operation of the host 110 illustrated in FIG. 7 may be omitted. For example, the storage device 120 may divide the plurality of nonvolatile memory devices NVM1 to NVM4 into the plurality of physical spaces PS1 to PS3, depending on a predefined manner In this case, the storage device 120 may provide information about the physical spaces PS thus divided to the host 110 and the host 110 may independently control the plurality of physical spaces PS1 to PS3 by using the received information about the physical spaces PS.

Figure 8:
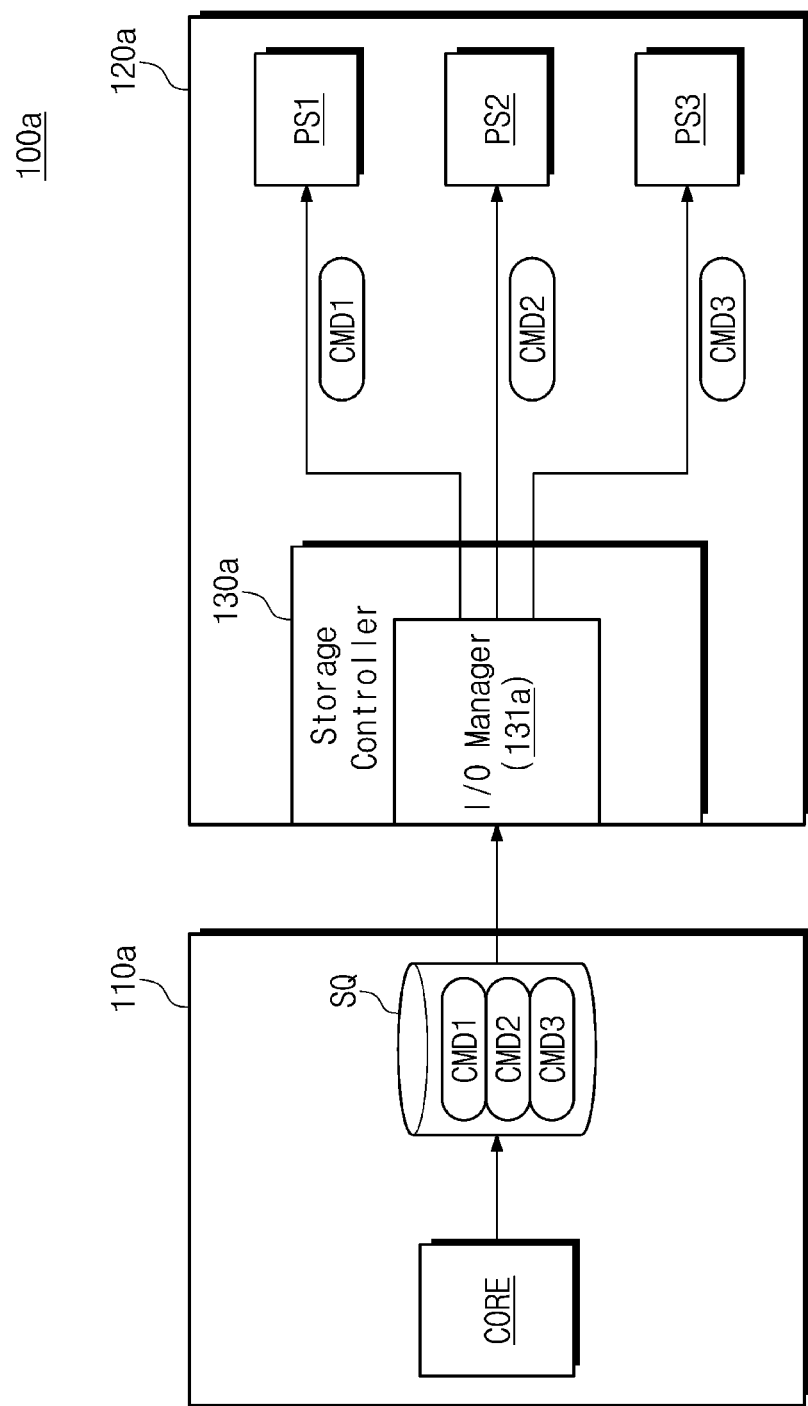
FIG. 8 illustrates a view for describing an operation of a storage device of FIG. 1.

FIG. 8 illustrates a view for describing an operation of a storage device of FIG. 1. For the sake of brevity, description of components that are unnecessary for understanding an operation of a storage system 100a may be omitted from the following. Referring to FIG. 8, a storage system 100a includes a host 110a and a storage device 120a.

The host 110a may include a core "CORE" and a submission queue SQ. The core "CORE" may be an information processing device or a processor that processes various applications driven on the host 110a. First to third commands CMD1 to CMD3 may be generated by an operation of the core "CORE".

As described above, the host 110a may physically divide and recognize a storage space of the storage device 120a into and as the first to third physical spaces PS1 to PS3. The host 110a may generate the first to third commands CMD1 to CMD3 generated from the core "CORE" to allow the first to third commands CMD1 to CMD3 to correspond to the different physical spaces PS1 to PS3, respectively. For example, the first command CMD1 may include information about the first physical space PS1, the second command CMD2 may include information about the second physical space PS2, and the third command CMD3 may include information about the third physical space PS3.

The submission queue SQ may queue the first to third commands CMD1 to CMD3 generated by the core "CORE". Although not illustrated in FIG. 8, the submission queue SQ may be stored in the host buffer memory 112 and may be managed by the host driver 111. The host driver 111 may provide commands from the submission queue SQ to the (external) storage device 120a.

A storage controller 130a of the storage device 120a may fetch the first to third commands CMD1 to CMD3 from the submission queue SQ of the host 110a and may process the fetched commands CMD1 to CMD3. In this case, the storage controller 130a may process the first to third commands CMD1 to CMD3 such that an operation of each of the first to third commands CMD1 to CMD3 is executed in a corresponding physical space PS.

For example, an input/output manager 131a of the storage controller 130a may perform an operation corresponding to the first command CMD1, based on the information about the first physical space PS1 included in the first command CMD1 or may transmit an instruction corresponding to the first command CMD1 to the nonvolatile memory devices (NVM1 of FIG. 1). The input/output manager 131a may process the second and third commands CMD2 and CMD3 as in the above description.

As described above, the host 110a may divide a storage area of the storage device 120a into physically isolated physical spaces PS and may generate commands to allow the commands to correspond to different physical spaces, respectively. In this case, each command may include information about a corresponding physical space PS. Alternatively, each command may further include information about a logical block address.

The storage device 120a may fetch a command from the submission queue SQ of the host 110a and may process the fetched command such that an operation corresponding to the fetched command is performed in a physical space corresponding to the fetched command. As understood from the above description, an independent operation or I/O may be provided with respect to each of physically isolated physical spaces under control of the host 110a.

Figure 9:
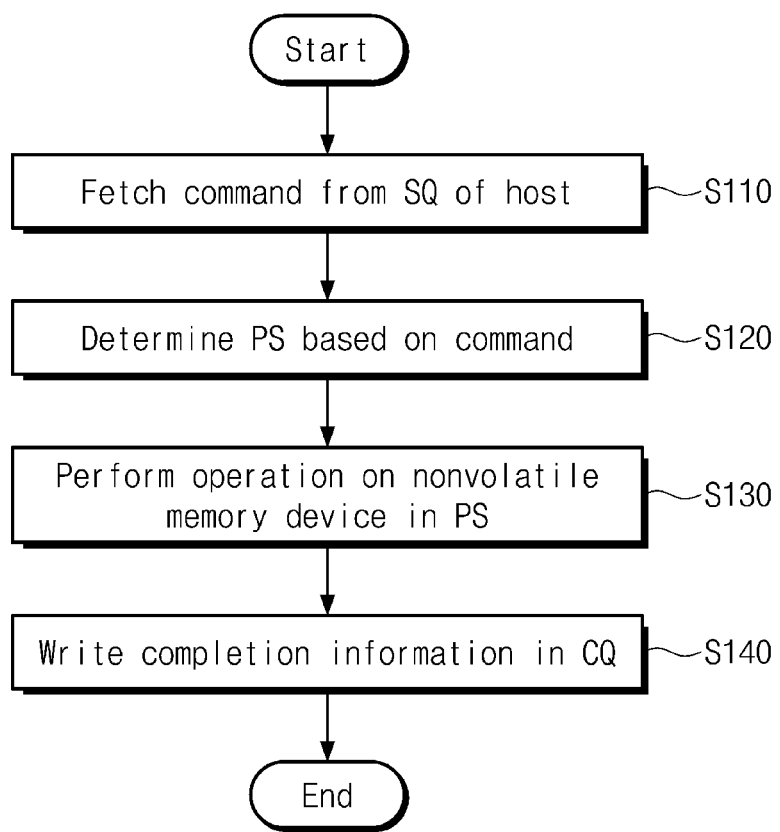
FIG. 9 illustrates a flowchart of an operation of the storage device of FIG. 8.

FIG. 9 illustrates a flowchart of an operation of a storage device of FIG. 8. For the sake of brevity, description associated with the same configuration or operation as described with respect to FIGS. 7 and 8 for example may not be repeated here. Referring to FIGS. 8 and 9, in operation S110, the storage device 120a (e.g., storage controller 130a and/or I/O manager 131a) may fetch a command from the submission queue SQ of the host 110a.

In operation S120, the storage device 120a may determine a physical space PS, based on the fetched command. For example, the storage device 120a may determine a corresponding physical space (e.g., from physical spaces PS1, PS2 and PS3 shown in FIG. 8), based on information about a physical space included in the fetched command.

In operation S130, the storage device 120a may perform a corresponding operation on a nonvolatile memory device included in the determined physical space.

In operation S140, the storage device 120a may write information indicating that an operation corresponding to the fetched command is completed, in a completion queue CQ. For example, although not illustrated in FIG. 8, the host 110a may further include the completion queue CQ. The storage device 120a may write information about completion of an operation in the completion queue CQ.

Figure 10:
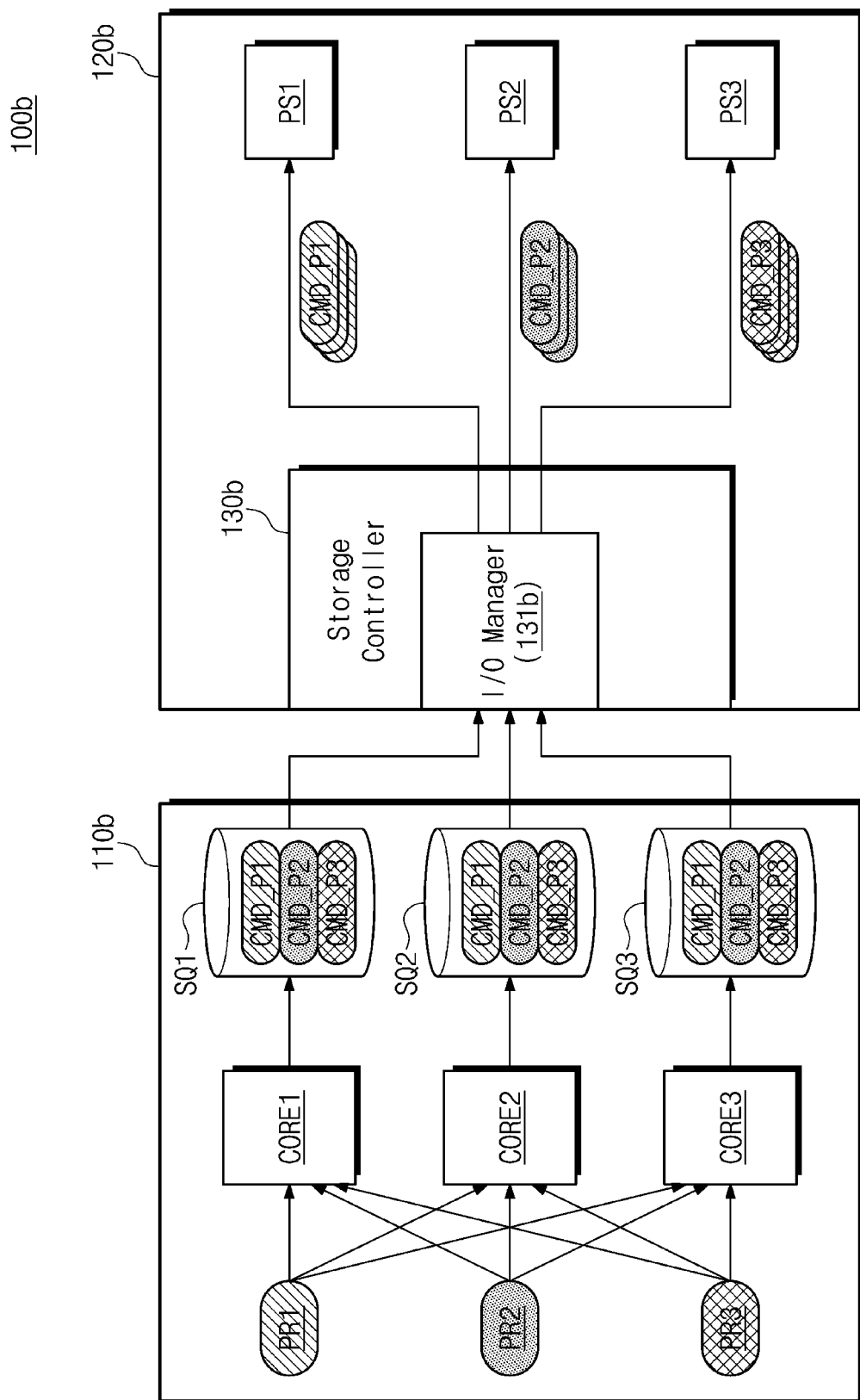
FIG. 10 illustrates a view for describing another operation of the storage system according to the flowchart of FIG. 9.

FIG. 10 illustrates a view for describing another operation of a storage system according to the flowchart of FIG. 9. For the sake of brevity, description of components unnecessary to for understanding of an operation of a storage system 100b may be omitted from the following.

Referring to FIGS. 1 and 10, the storage system 100b includes a host 110b and a storage device 120b. The host 110b may perform first to third processes PR1 to PR3. The first to third processes PR1 to PR3 may be processes for various applications that are executed in the host 110b. The host 110b may include a multi-core processor including first to third cores CORE1 to CORE3, respectively. Alternatively, the host 110b may include single-core processors including the first to third cores CORE1 to CORE3.

The first to third processes PR1 to PR3 may be respectively or independently executed by the first to third cores CORE1 to CORE3. For example, the first process PR1 may be distributed into and executed by the first to third cores CORE1 to CORE3, the second process PR2 may be distributed into and executed by the first to third cores CORE1 to CORE3, and the third process PR3 may be distributed into and executed by the first to third cores CORE1 to CORE3.

The first to third cores CORE1 to CORE3 may execute the first to third processes PR1 to PR3 to generate first to third commands CMD_P1 to CMD_P3 corresponding to the first to third processes PR1 to PR3, respectively. The first command CMD_P1 may be a command for the first process PR1, the second command CMD_P2 may be a command for the second process PR2, and the third command CMD_P3 may be a command for the third process PR3.

The first to third commands CMD_P1 to CMD_P3 thus generated may be respectively queued in corresponding submission queues SQ. For example, a first submission queue SQ1 corresponding to the first core CORE1 may exist, a second submission queue SQ2 corresponding to the second core CORE2 may exist, and a third submission queue SQ3 corresponding to the third core CORE3 may exist. That is, as illustrated in FIG. 10, each of the first to third submission queues SQ1 to SQ3 may include the first to third commands CMD_P1 to CMD_P3. The first to third submission queues SQ1 to SQ3 may be stored or included in the host buffer memory 112 of FIG. 1.

In an example embodiment, as described above, the host 110b may recognize the first to third physical spaces PS1 to PS3. In this case, the host 110b may allow operations of the first to third processes PR1 to PR3 to be respectively executed in the physically isolated first to third physical spaces PS1 to PS3.

For example, the host 110b may generate the first command CMD_P1 to allow the first command CMD_P1 to include information (e.g., a physical space ID or the like) about the first physical space PS1. Likewise, the host 110b may generate the second command CMD_P2 to allow the second command CMD_P2 to include information about the second physical space PS2 and may generate the third command CMD_P3 to allow the third command CMD_P3 to include information about the third physical space PS3. That is, the host 110b may generate or manage respective commands such that an operation associated with the first process PR1 is executed in the first physical space PS1, such that an operation associated with the second process PR2 is executed in the second physical space PS2, and such that an operation associated with the third process PR3 is executed in the third physical space PS3.

A storage controller 130b of the storage device 120b may fetch the first to third commands CMD_P1 to CMD_P3 from the first to third submission queues SQ1 to SQ3 of the host 110b. The storage controller 130b may respectively provide the fetched first to third commands CMD_P1 to CMD_P3 to the corresponding physical spaces such that operations corresponding to the first to third commands CMD_P1 to CMD_P3 are executed in the corresponding physical spaces.

For example, an input/output manager 131b of the storage controller 130b may determine a physical space, based on a received command. The input/output manager 131b may control the determined physical space such that a corresponding operation is performed in the determined physical space.

That is, the first command CMD_P1 may include information about the first physical space PS1. The input/output manager 131b may determine that the first command CMD_P1 is a command corresponding to the first physical space PS1, based on the information about the first physical space PS1 included in the first command CMD_P1. The input/output manager 131b may perform the operation corresponding to the first command CMD_P1 in the first physical space PS1, depending on the determination result. As in the above description, the input/output manager 131b may perform operations respectively corresponding to the second and third commands CMD_P2 and CMD_P3 in the second and third physical spaces PS2 and PS3, respectively.

As described above, the host 110b may recognize a storage area of the storage device 120b as physically isolated physical spaces PS and may independently control the physical spaces PS. That is, the host 110b may assign operations (or I/Os) of the plurality of processes PR1 to PR3 to the different physical spaces PS1 to PS3 and may control or manage the storage area of the storage device 120b such that the operations of the processes PR1 to PR3 are respectively or independently performed in the different physical spaces.

Although not illustrated in FIG. 10, the host 110b may further include a completion queue CQ. For example, the completion queue CQ may be stored in a host buffer memory such as host buffer memory 112 of FIG. 1. The host 110b may include a first completion queue corresponding to the first submission queue SQ1, a second completion queue corresponding to the second submission queue SQ2 and a third completion queue corresponding to the third submission queue SQ3. After completing an operation corresponding to a fetched command, the storage device 120b may write information about completion of the operation in the completion queue CQ.

Figure 11:
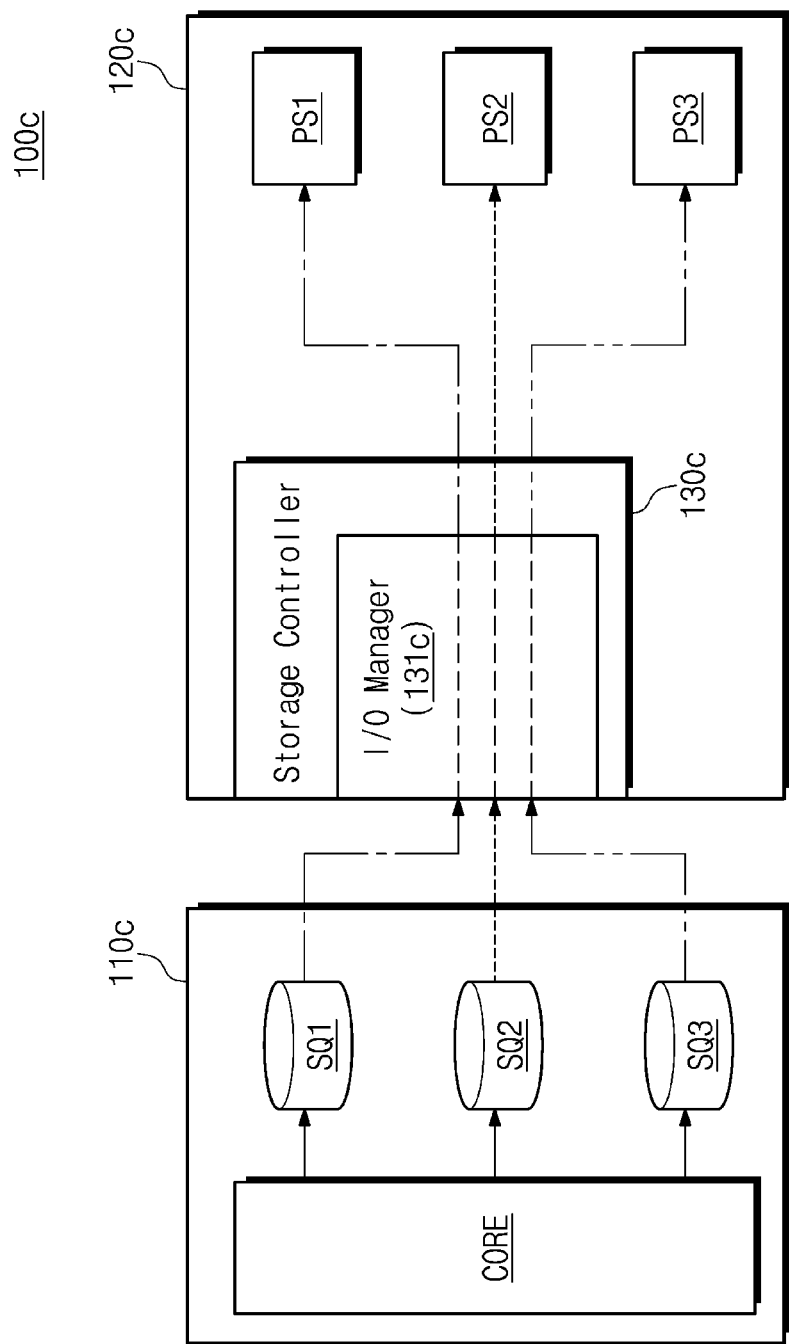
FIG. 11 illustrates a view for describing an operation of the storage system of FIG. 1.

FIG. 11 illustrates a view for describing an operation of a storage system of FIG. 1. For the sake of brevity, description of components that are unnecessary for understanding of an operation of a storage system 100c may be omitted from the following.

Referring to FIG. 11, the storage system 100c includes a host 110c and a storage device 120c. The host 110c may include a core "CORE" and the first to third submission queues SQ1 to SQ3. In an example embodiment, as illustrated in FIG. 11, the host 110c may be configured to generate the first to third submission queues SQ1 to SQ3 (i.e., a plurality of submission queues) with respect to one core "CORE". Commands generated by an operation of the core "CORE" may be queued in the first to third submission queues SQ1 to SQ3. In an example embodiment, the numbers of cores and first to third submission queues SQ1 to SQ3 illustrated in FIG. 11 are exemplary, and in other embodiments different numbers of cores and/or submission queues may be implemented.

In an example embodiment, each of the first to third submission queues SQ1 to SQ3 may be mapped onto different physical spaces PS. For example, commands queued in the first submission queue SQ1 may be set to be executed in the first physical space PS1, commands queued in the second submission queue SQ2 may be set to be executed in the second physical space PS2, and commands queued in the third submission queue SQ3 may be set to be executed in the third physical space PS3.

A storage controller 130c of the storage device 120c may fetch commands from the first to third submission queues SQ1 to SQ3. The storage controller 130c may execute the fetched commands in the first to third physical spaces PS1 to PS3, based on the first to third submission queues SQ1 to SQ3. For example, under control of an input/output manager 131c, a command received from the first submission queue SQ1 may be processed in the first physical space PS1, a command received from the second submission queue SQ2 may be processed in the second physical space PS2, and a command received from the third submission queue SQ3 may be processed in the third physical space PS3. That is, the storage device 120c may determine a physically isolated physical space depending on a submission queue from which a command is fetched and may process the fetched command in the determined physical space.

In an example embodiment, mapping between the first to third submission queues SQ1 to SQ3 and the first to third physical spaces PS1 to PS3 may be set upon generating a submission queue. For example, the host 110c may generate the first to third submission queues SQ1 to SQ3 by using a Create I/O Submission Queue command. In this case, information about a corresponding physical space may be included in a reserved field of the Create I/O Submission Queue command That is, a submission queue SQ that is generated by the Create I/O Submission Queue command including information about a specific physical space may be mapped onto the specific physical space, and a command fetched from the generated submission queue SQ may be processed in the specific physical space.

Figure 12:
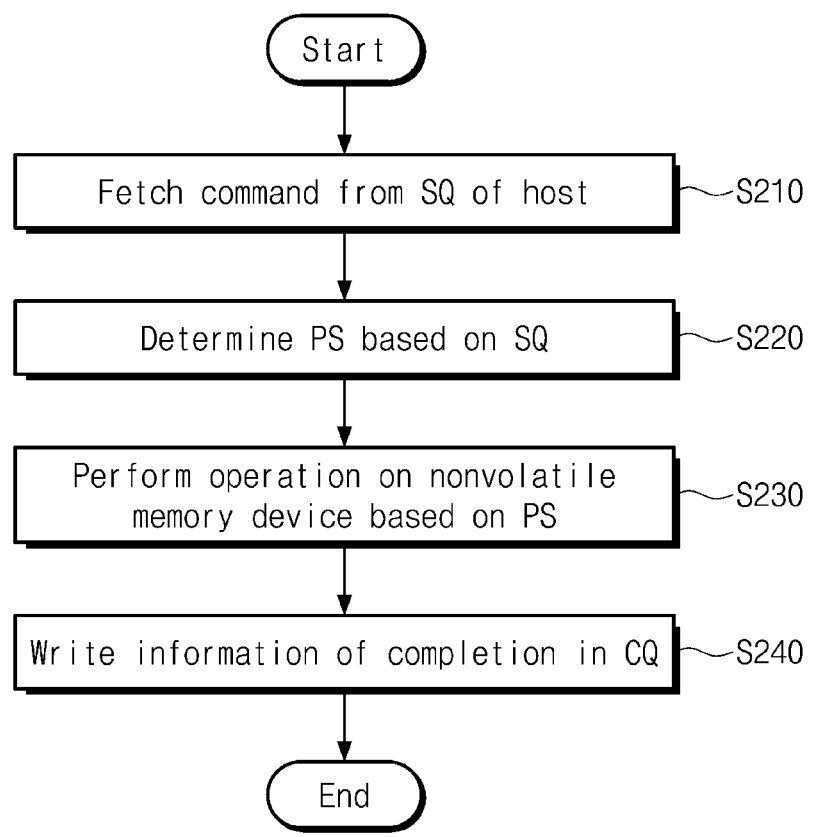
FIG. 12 illustrates a flowchart of an operation of the storage device of FIG. 11.

FIG. 12 illustrates a flowchart of an operation of a storage device of FIG. 11. Referring to FIGS. 11 and 12, the storage device 120c performs operation S210. Operation S210 may be similar to operation S110 of FIG. 9, and detailed description thereof is therefore omitted.

In operation S220, the storage device 120c determines a physical space PS, based on a submission queue SQ. For example, as described above, the submission queue SQ may be mapped onto a specific physical space PS. The storage controller 130c may determine a physical space PS corresponding to a submission queue SQ from which a command is fetched.

Afterwards, the storage device 120c performs operation S230 and operation S240. Operation S230 and operation S240 may be similar to operation S130 and operation S140 of FIG. 9, and detailed description thereof is therefore omitted.

Figure 13:
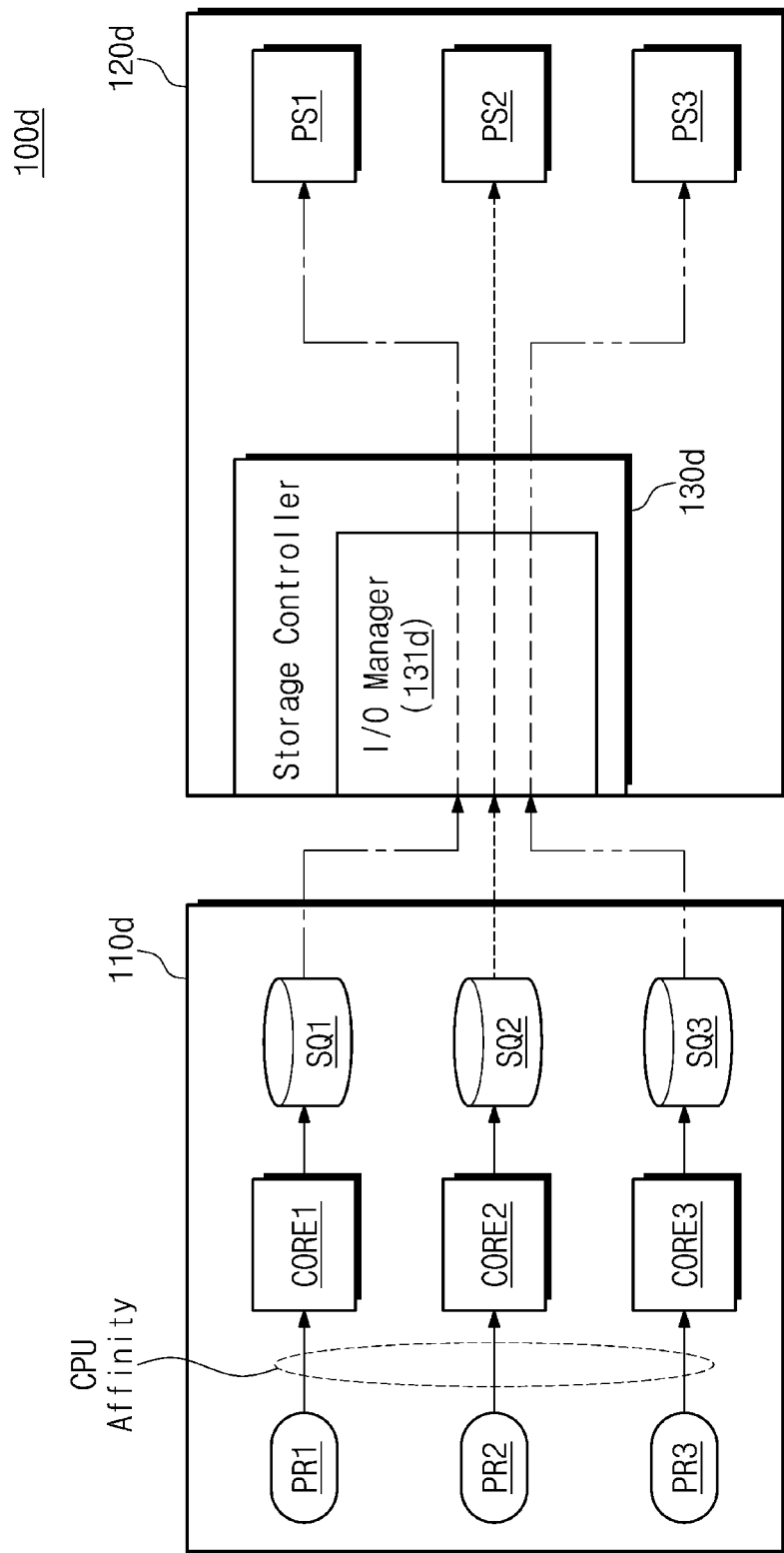
FIG. 13 illustrates a view for describing another operation of the storage system according to the flowchart of FIG. 12.

FIG. 13 illustrates a view for describing another operation of a storage system according to a flowchart of FIG. 12. For the sake of brevity, description of components that are unnecessary for understanding of an operation of a storage system 100d are omitted.

Referring to FIG. 13, the storage system 100d includes a host 110d and a storage device 120d. The host 110d may include the first to third cores CORE1 to CORE3. Unlike the example embodiment of FIG. 10, in the example embodiment of FIG. 13, the first to third cores CORE1 to CORE3 may execute the first to third processes PR1 to PR3, respectively. For example, the first core CORE1 may execute only the first process PR1, the second core CORE2 may execute only the second process PR2, and the third core CORE3 may execute only the third process PR3. As one process is executed by one core, independent performance for process processing may be secured.

A way to assign the process, as above described, is called "CPU affinity". That is, when the CPU affinity is activated, one process may be assigned to and executed by one core. Since one process is executed by one core, a command queued in one submission queue SQ may be a command associated with one process. For example, the first process PR1 may be executed by the first core CORE1, and a command generated in the first core CORE1 is queued in the first submission queue SQL Likewise, the second process PR2 may be executed by the second core CORE2, and a command generated in the second core CORE2 is queued in the second submission queue SQ2; and the third process PR3 may be executed by the third core CORE3, and a command generated in the third core CORE3 is queued in the third submission queue SQ3.

Subsequent operations of the storage device 120d, a storage controller 130d, and an input/output manager 131d are similar to the operations of the storage device 120c, the storage controller 130c, and the/output manager 131c of FIG. 11, and thus detailed description thereof is omitted.

As described above, in the case where the CPU affinity is executed by the host 110d, according to embodiments of the inventive concepts, an operation associated with one process may be performed in a physically isolated physical space PS. Accordingly, with regard to each process, a specific level of performance may be secured.

As described above, a host according to embodiments of the inventive concepts may physically divide a storage area of a storage device to recognize the physically divided areas as physical spaces PS. The host may independently control physical spaces PS by autonomously setting the physical spaces PS physically isolated or by using the physical spaces PS set in a storage device. In this case, a way to independently control each physical space PS may be implemented by using various conditions such as a command, a process PR, a submission queue SQ, a virtual function VF, and the like. Embodiments of the inventive concepts should not be limited to the above-described embodiments, and it should be understood that it is possible to modify, combine, or change the above-described embodiments, to delete one or more aspects of the above-described embodiments, or to add an example embodiment(s).

Figure 14:
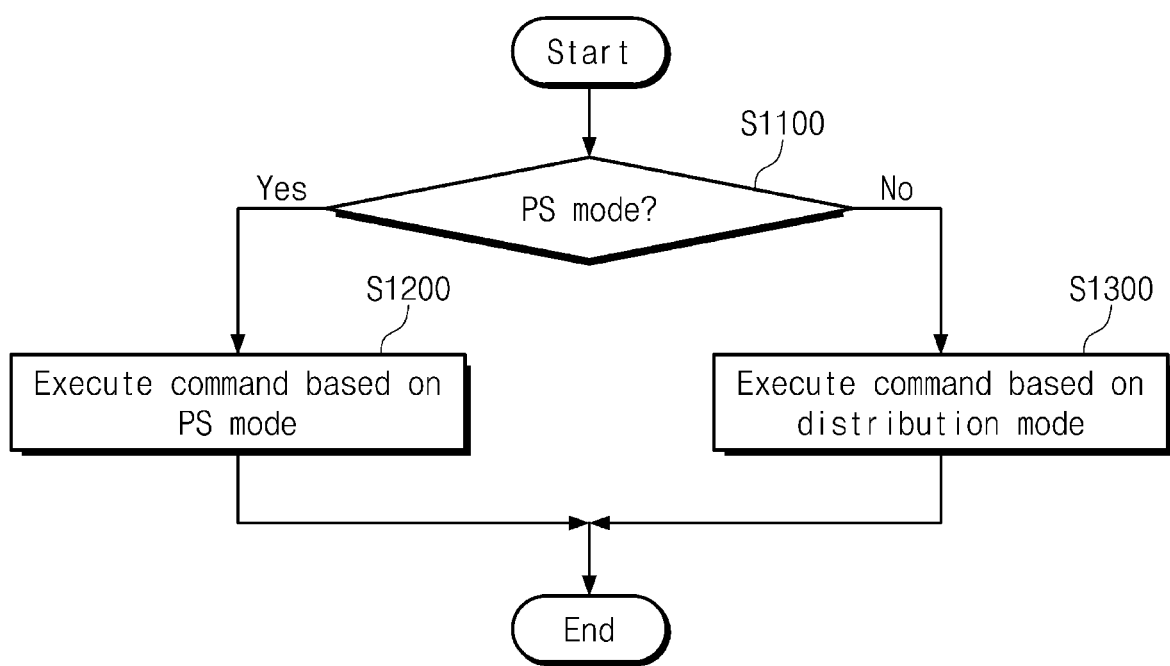
FIG. 14 illustrates a flowchart of an operation of the storage system of FIG. 1.

FIG. 14 illustrates a flowchart of an operation of a storage system of FIG. 1. Referring to FIGS. 1 and 14, in operation S1100, the storage system 100 determines whether a set operation mode is a physical space (PS) mode. In an example embodiment, the physical space mode indicates an operation mode in which the host 110 recognizes a storage area of the storage device 120 as a physically isolated physical space PS depending on the operation method described with reference to FIGS. 1 to 13.

In an example embodiment, the above-described operation mode may be set in various manners. For example, an operation mode may be set by a request of a user. Alternatively, the operation mode may be set according to the following operation state of the host 110: whether the CPU affinity is activated, whether a load is distributed, a load, and the like. Alternatively, the operation mode may be set according to an operation state of the storage device 120.

If the set operation mode is the physical space mode (Yes in operation S1100), in operation S1200 the storage system 100 operates based on the operation methods described with reference to FIGS. 1 to 13. That is, the host 110 may recognize a storage area of the storage device 120 as physically isolated physical spaces PS and may control the physical spaces PS independently.

If the set operation mode is not the physical space mode (No in operation S1100), in operation S1300 the storage system 100 operates based on a distribution mode. In an example embodiment, the distribution mode may indicate an operation that is based on the well-known NVMe interface. In an example embodiment, the distribution mode may be an operation mode that is based on a namespace NS in which a storage area of the storage device 120 is logically divided.

Figure 15:
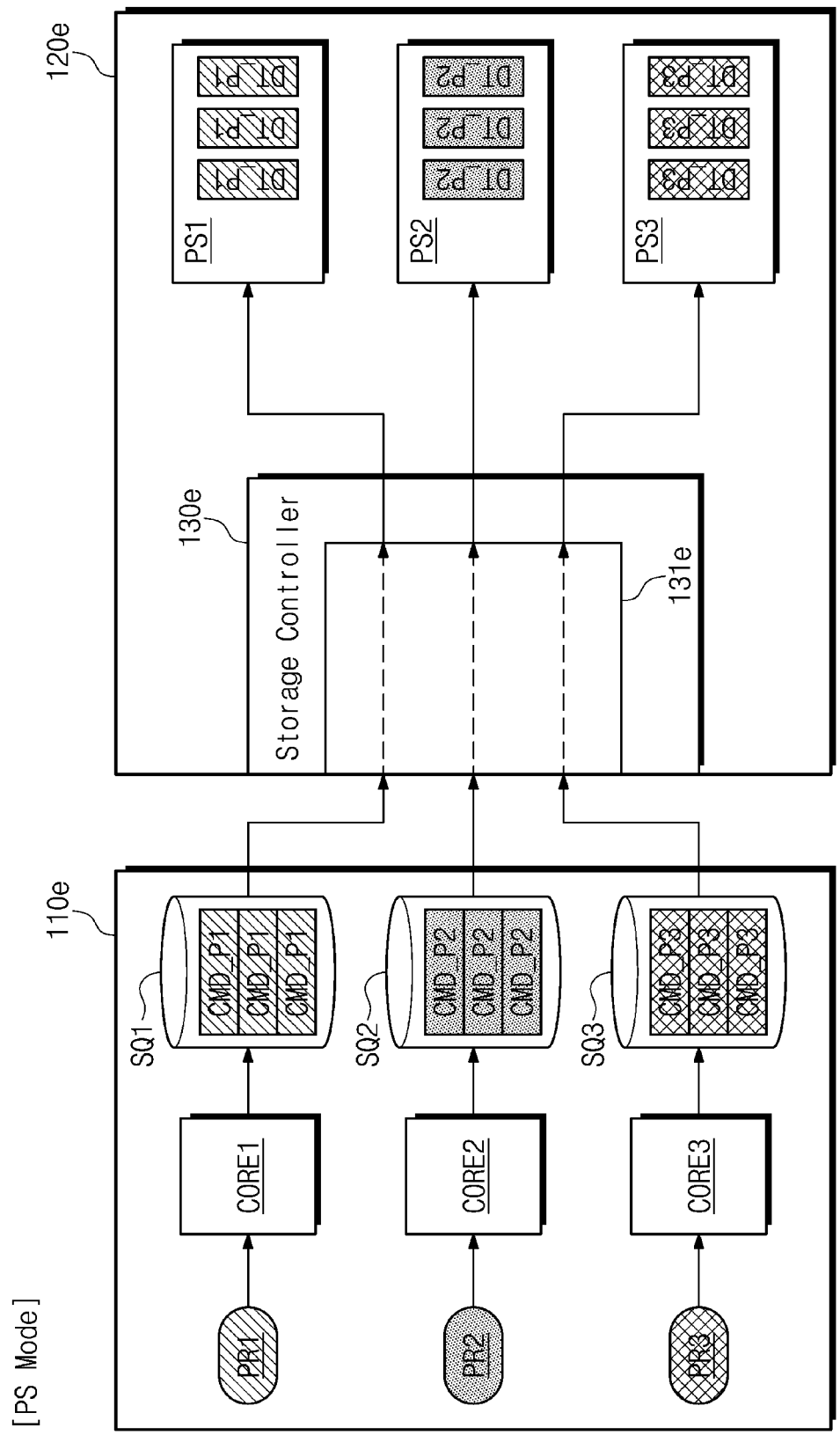
FIG. 15 illustrates a view for describing a physical space mode of FIG. 14.
Figure 16:
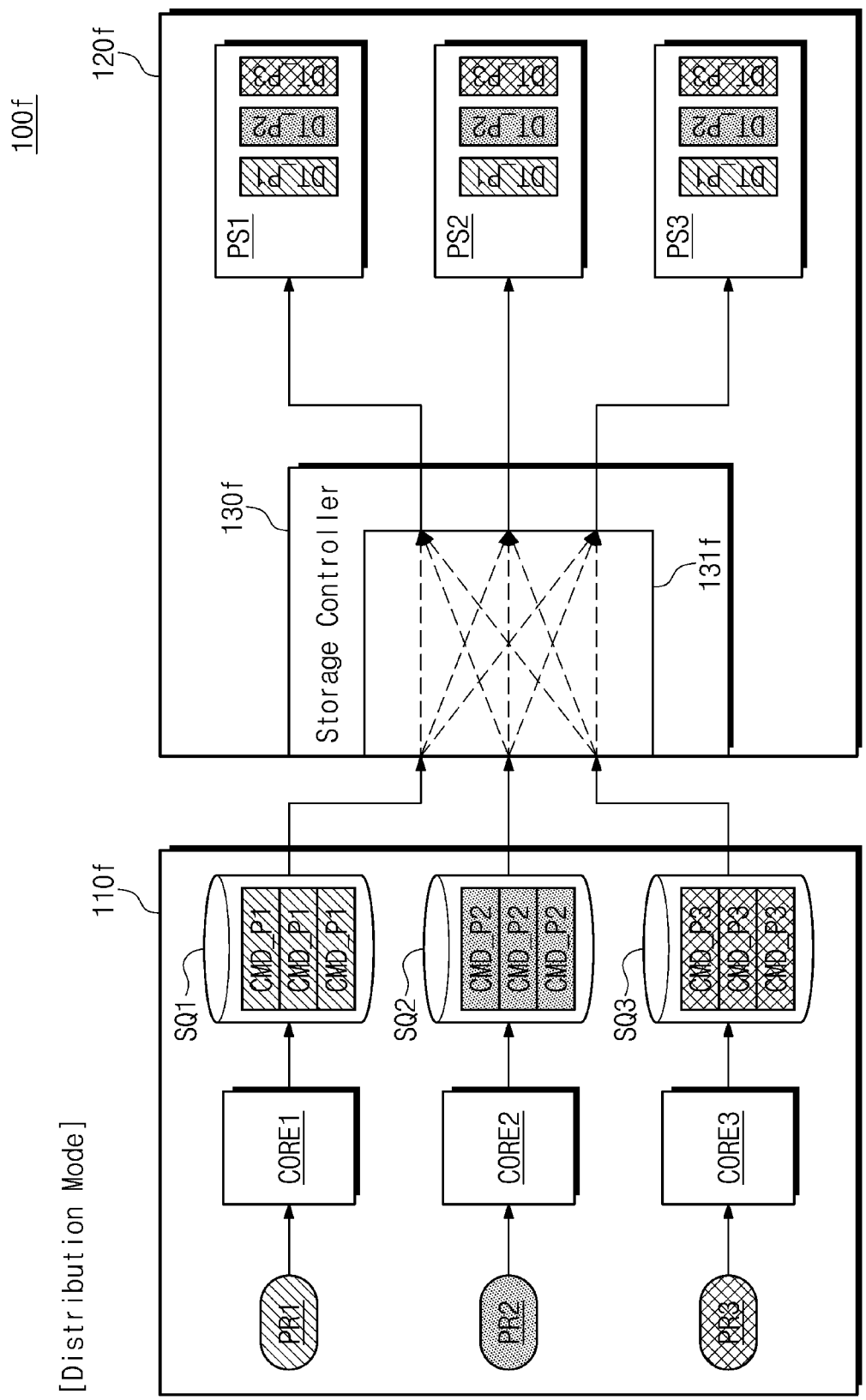
FIG. 16 illustrates a view for describing a distribution mode of FIG. 14.

FIGS. 15 and 16 illustrate views for describing a physical space mode and a distribution mode of FIG. 14. The physical space (PS) mode will be described with reference to FIG. 15, and the distribution mode will be described with reference to FIG. 16. For convenience of description, it is assumed that a command generated in each of hosts 110e and 110f of FIGS. 15 and 16 is a write command. According to this assumption, each of storage devices 120e and 120f may perform a write operation in response to the generated command.

Referring to FIG. 15, the storage system 100e includes a host 110e and the storage device 120e. The host 110e may include the first to third cores CORE1 to CORE3, the first to third processes PR1 to PR3 may be executed by the first to third cores CORE1 to CORE3, and the first to third commands CMD_P1 to CMD_P3 generated by the first to third cores CORE1 to CORE3 may be respectively queued in the first to third submission queues SQ1 to SQ3. A configuration and an operation of the host 110e is similar to those of the embodiment of FIG. 13 (i.e., the case where the CPU affinity is activated), and thus detailed description thereof is omitted.

The storage device 120e may fetch the first to third commands CMD_P1 to CMD_P3 from the first to third submission queues SQ1 to SQ3. In the case where a set operation mode is the physical space mode, an input/output manager 131e of a storage controller 130e may process the first to third commands CMD_P1 to CMD_P3, based on submission queues SQ from which the first to third commands CMD_P1 to CMD_P3 are fetched, as described with reference to FIG. 13. In this case, first data DT_P1 associated with the first command CMD_P1 may be stored in the first physical space PS1, second data DT_P2 associated with the second command CMD_P2 may be stored in the second physical space PS2, and third data DT_P3 associated with the third command CMD_P3 may be stored in the third physical space PS3.

That is, in the physical space mode, since data associated with different cores or different processes are respectively stored in the physically isolated physical spaces PS1 to PS3, commands or I/Os of the different cores or the different processes may not be mutually affected.

Referring to FIG. 16, the storage system 100f includes a host 110f and a storage device 120f. Components CORE1 to CORE3, PR1 to PR3, and SQ1 to SQ3 of the host 110f are similar as described above, and thus detailed description thereof is omitted.

The storage device 120f may fetch the first to third commands CMD_P1 to CMD_P3 from the first to third submission queues SQ1 to SQ3. In an example embodiment, in the case where a set operation mode is not the physical space (PS) mode (i.e., in the case where the set operation mode is the distribution mode), an input/output manager 131f of a storage controller 130f may distribute and perform operations of the first to third commands CMD_P1 to CMD_P3. For example, the first data DT_P1 associated with the first command CMD_P1 may be distributed into and stored in the first to third physical spaces PS1 to PS3. Also, the second data DT_P2 associated with the second command CMD_P2 may be distributed into and stored in the first to third physical spaces PS1 to PS3, and the third data DT_P3 associated with the third command CMD_P3 may be distributed into and stored in the first to third physical spaces PS1 to PS3. That is, each of the first to third physical spaces PS1 to PS3 may include all the first to third data DT_P1 to DT_P3.

As described above, by distributing and storing data for one core or one process into and in the respective physical spaces PS, in the case where a failure occurs in a specific physical space PS, data may be restored by using data of the remaining physical spaces PS. Accordingly, the reliability of the storage system 100f may be improved.

In the embodiment of FIG. 16, data may be distributed into the first to third physical spaces PS1 to PS3. However, in other embodiments, in the case where for example the set operation mode is not the physical space mode, the storage system 100f may operate based on the well-known NVMe interface. In this case, the first to third data DT_P1 to DT_P3 associated with the first to third commands CMD_P1 to CMD_P3 may be stored in different namespaces NS that are logically divided. That is, the first data DT_P1 associated with the first command CMD_P1 may be stored in the first namespace NS1, the second data DT_P2 associated with the second command CMD_P2 may be stored in the second namespace NS2, and the third data DT_P3 associated with the third command CMD_P3 may be stored in the third namespace NS3. In this case, data stored in the same namespace may be stored in physically isolated physical spaces.

Figure 17:
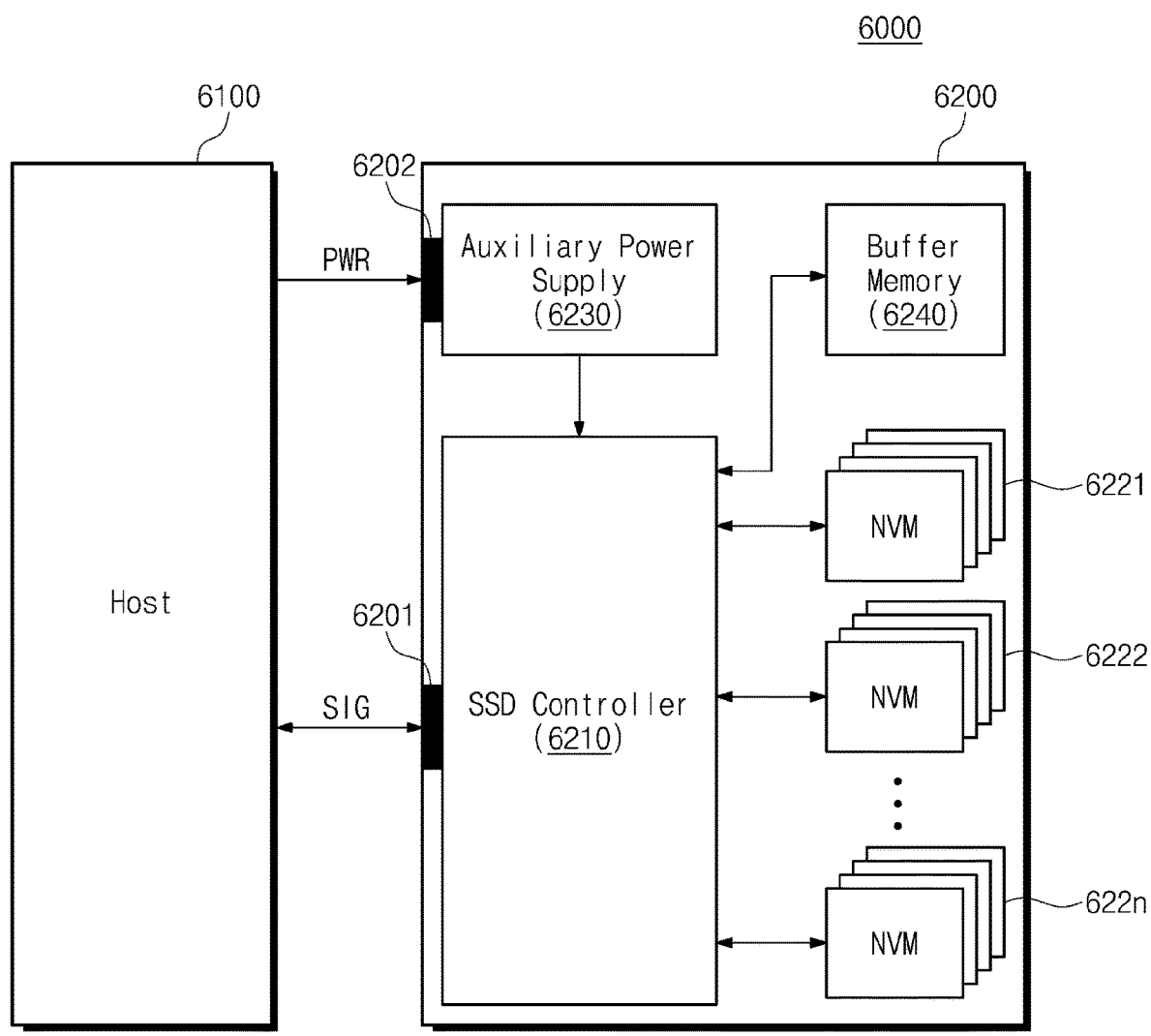
FIG. 17 illustrates a block diagram illustrating a solid state drive system to which the storage system according to an example embodiment of the inventive concept is applied.

FIG. 17 illustrates a block diagram of a solid state drive (SSD) system to which a storage system according to example embodiments of the inventive concepts may be applied. Referring to FIG. 17, an SSD system 6000 includes a host 6100 and an SSD 6200.

The SSD 6200 transmits and receives a signal SIG to and from the host 6100 through a signal connector 6201 and is supplied with power PWR through a power connector 6202. In an example embodiment, the signal connector 6201 may be a PCIe port, the signal SIG may be a signal defined in the NVMe protocol, and the SSD 6200 may be an NVMe-based storage device. The SSD 6200 includes an SSD controller 6210, a plurality of flash memories 6221, 6222 to 622n, an auxiliary power supply 6230, and a buffer memory 6240. In an example embodiment, each of the plurality of flash memories 6221 to 622n may be implemented with a separate chip or a separate package and may be recognized as a physical space PS by the host 6100.

The SSD controller 6210 may control the plurality of flash memories 6221 to 622n in response to the signal SIG received from the host 6100. In an example embodiment, the SSD controller 6210 may operate based on the operation method described with reference to FIGS. 1 to 16.

The flash memories 6221 to 622n may operate under control of the SSD controller 6210. The auxiliary power supply 6230 is connected with the host 6100 through the power connector 6202. The auxiliary power supply 6230 may be charged by the power PWR from the host 6100. When the power PWR is not smoothly supplied from the host 6100, the auxiliary power supply 6230 may power the SSD system 6200.

According to example embodiments of the inventive concepts, a host of a storage system may physically divide a storage area of a storage device, recognize the physically divided areas as physical spaces PS, and may control the physical spaces PS independently of each other. Since operations or input/output (I/O) of the physical spaces PS are physically isolated from each other, a storage device having stable performance or improved performance, a host device controlling the storage device, and an operation method of the storage device may be provided.

While the inventive concepts have been described with reference to exemplary embodiments thereof, it will be apparent to those of ordinary skill in the art that various changes and modifications may be made thereto without departing from the spirit and scope of the inventive concepts as set forth in the following claims.

What is claimed is:

1. An operation method of a host configured to control a storage device, the operation method comprising:
generating a first submission queue associated with a first nonvolatile memory set (NVM set) by using a first Create I/O Submission Queue command including information on the first NVM set;
generating a second submission queue associated with a second NVM set by using a second Create I/O Submission Queue command including information on the second NVM set;
queueing a first command to the first submission queue associated with the first NVM set, the first command to be processed in the first NVM set; and
queueing a second command to the second submission queue associated with the second NVM set, the second command to be processed in the second NVM set.

2. The operation method of claim 1, further comprising:
receiving device information from the storage device, and wherein the device information includes information on a number of configurable NVM sets.

3. The operation method of claim 1, wherein the first NVM set includes at least one first namespace, the second NVM set includes at least one second namespace, and the second NVM set physically isolated from the first NVM in the storage device.

4. The operation method of claim 1, wherein the first command is generated by a first core, and the second command is generated by a second core different from the first core.

5. The operation method of claim 1, wherein the first command is generated by a first process driven on the host, and the second command is generated by a second process driven on the host, the first process and the second process different from each other.

6. The operation method of claim 1, wherein a performance about the first submission queue secures a first reference level and a performance about the second submission queue secures a second reference level.

7. The operation method of claim 1, wherein information indicating that a first operation corresponding to the first command is completed is written in a first completion queue corresponding to the first submission queue,
information indicating that a second operation corresponding to the second command is completed is written in a second completion queue corresponding to the second submission queue.

8. The operation method of claim 1, wherein the host sets mapping between the first and second submission queues with the first and second NVM sets by generating the first and second submission queues.

9. The operation method of claim 1, wherein the host communicates with the storage device through a nonvolatile memory express (NVMe) interface.

10. A host device comprising:
a first core configured to drive a first process to generate a first input/output (I/O) command;
a second core configured to drive a second process to generate a second I/O command; and
a host driver configured to:
generate a first submission queue by using a first Create I/O Submission Queue command including information on a first nonvolatile memory set (NVM set) of an external storage device;
generate a second submission queue by using a second Create I/O Submission Queue command including information on a second NVM set of the external storage device;
queue the first I/O command to the first submission queue such that the first I/O command is processed in the first NVM set; and
queue the second I/O command to the second submission queue such that the second I/O command is processed in the second NVM set.

11. The host device of claim 10, wherein the first NVM set includes at least one first namespace, the second NVM set includes at least one second namespace, and the second NVM set physically isolated from the first NVM set in the external storage device.

12. The host device of claim 10, further comprising a physical port configured to provide communication with the external storage device, the physical port based on a peripheral component interconnect express (PCIe) interface or a nonvolatile memory express (NVMe) interface.

13. The host device of claim 10, further comprising:
a host memory buffer including the first submission queue and the second submission queue.

14. The host device of claim 13, wherein the host memory buffer further includes a first completion queue corresponding to the first submission queue and a second completion queue corresponding to the second submission queue.

15. The host device of claim 13, wherein the host memory buffer further includes an administration queue configured to manage the first Create I/O Submission Queue command and the second Create I/O Submission Queue command.

16. A storage system comprising:
a host device configured to queue first I/O command in a first submission queue and a second I/O command submission queue; and
a storage device including:
a first nonvolatile memory (NVM) set including at least one first namespace;
a second nonvolatile memory (NVM) set including at lease one second namespace; and
a storage controller configured to fetch the first I/O command from the first submission queue to perform a first I/O operation on the first NVM set in response to the first I/O command, and fetch the second I/O command from the second submission queue to perform a second I/O operation on the second NVM set in response to the second I/O command,
wherein:
the host device is further configured to generate the first submission queue by using a first Create I/O Submission Queue command including information on the first NVM set, and generate the second submission queue by using a second Create I/O Submission Queue command including information on the second NVM set.

17. The storage system of claim 16, wherein the storage controller is further configured to:
write information indicating that the first I/O operation is completed in a first completion queue corresponding to the first submission queue; and
write information indicating that the second I/O operation is completed in a second completion queue corresponding to the second submission queue.

18. The storage system of claim 17, wherein the host device comprises:
a first core configured to drive a first process to generate the first I/O command;
a second core configured to drive a second process to generate the second I/O command;
a host driver configured to generate the first submission queue and the second submission queue, and queue the first I/O command and the second I/O command in the first submission queue and the second I/O command submission queue, respectively; and
a host memory buffer including the first submission queue, the second submission queue, the first completion queue, and the second completion queue.

19. The storage system of claim 16, wherein the storage device further comprises a plurality of nonvolatile memory devices configured to communicate with the storage controller through a plurality of channels,
the first NVM set includes at least one first nonvolatile memory device, connected to a first channel of the plurality of channels, among of the plurality of nonvolatile memory devices, and
the second NVM set includes at least one second nonvolatile memory device, connected to a second channel of the plurality of channels, among of the plurality of nonvolatile memory devices.

20. The storage system of claim 16, wherein the host device and the storage controller communicate with each other through a nonvolatile memory express (NVMe) interface.

* * * * *